US011157522B2

(12) United States Patent
Krasnikov et al.

(10) Patent No.: US 11,157,522 B2
(45) Date of Patent: Oct. 26, 2021

(54) METHOD OF AND SYSTEM FOR PROCESSING ACTIVITY INDICATIONS ASSOCIATED WITH A USER

(71) Applicant: YANDEX EUROPE AG, Lucerne (CH)

(72) Inventors: Andrey Borisovich Krasnikov, Moscow (RU); Gennady Gennadievich Kuzmin, Kabardino-Balkarian Republic (RU); Sergey Aleksandrovich Shiryaev, Moscow region (RU); Dmitrii Petrovich Sopin, Nizhni Novgorod (RU); Sergei Olegovich Lisitcyn, Samara region (RU); Dmitrii Aleksandrovich Levanov, Novosibirsk region (RU); Dmitrii Andreyevich Kuksa, Krasnoyarsk region (RU); Sergey Victorovich Kotsur, Rostov region (RU)

(73) Assignee: YANDEX EUROPE AG, Lucerne (CH)

( * ) Notice: Subject to any disclaimer, the term of this patent is extended or adjusted under 35 U.S.C. 154(b) by 600 days.

(21) Appl. No.: 15/558,274

(22) PCT Filed: Oct. 8, 2015

(86) PCT No.: PCT/IB2015/057701
§ 371 (c)(1),
(2) Date: Sep. 14, 2017

(87) PCT Pub. No.: WO2016/156946
PCT Pub. Date: Oct. 6, 2016

(65) Prior Publication Data
US 2018/0060412 A1 Mar. 1, 2018

(30) Foreign Application Priority Data
Mar. 31, 2015 (RU) .......................... RU2015111633

(51) Int. Cl.
*G06F 16/28* (2019.01)
*G06F 16/58* (2019.01)
(Continued)

(52) U.S. Cl.
CPC ........ *G06F 16/285* (2019.01); *G06F 16/5866* (2019.01); *G06Q 30/02* (2013.01);
(Continued)

(58) Field of Classification Search
CPC .............. G06F 16/285; G06F 16/5866; G06Q 30/0255; G06Q 30/0276; G06Q 30/02; G06N 3/0454
See application file for complete search history.

(56) References Cited

U.S. PATENT DOCUMENTS 5,754,939 A 5/1998 Herz et al.
8,150,723 B2 4/2012 Chen et al.
(Continued)

FOREIGN PATENT DOCUMENTS

RU 2523930 C2 7/2014
WO 2000033228 A1 6/2000

OTHER PUBLICATIONS

International Search Report with regard to PCT/IB2015/057701 dated Jan. 14, 2016.
(Continued)

*Primary Examiner* — Albert M Phillips, III
*Assistant Examiner* — Fatima P Mina
(74) *Attorney, Agent, or Firm* — BCF LLP

(57) ABSTRACT

A method (1400) of and a system (222) for associating past activity indications (602) associated with past activities of a user (170) with items. The method comprises accessing (1402) the past activity indications (602); accessing (1404) item indications; determining (1406) a past activity feature vector (606); determining (1408) a text feature vector (706)
(Continued)

corresponding to the text features; mapping (1410) the past activity feature vector (606) and the text feature vector (706) to generate a text feature space (904); determining (1412) an image feature vector (806); mapping (1414) the past activity feature vector (606) and the image feature vector (806) to generate an image feature space (1004); generating a user item space (1104); and storing (1418) the user item space (1104). A method (1500) of and a system (222) for associating a first item and a second item are also disclosed.

12 Claims, 15 Drawing Sheets

(51) Int. Cl.
*G06Q 30/02* (2012.01)
*G06N 3/04* (2006.01)
(52) U.S. Cl.
CPC ..... *G06Q 30/0255* (2013.01); *G06Q 30/0276* (2013.01); *G06N 3/0454* (2013.01)

(56) References Cited

U.S. PATENT DOCUMENTS

| | | | |
|---|---|---|---|
| 8,180,769 B2 | 5/2012 | Liu et al. | |
| 8,321,278 B2 | 11/2012 | Haveliwala et al. | |
| 8,423,558 B2 | 4/2013 | Kilroy et al. | |
| 8,504,411 B1 | 8/2013 | Subasic et al. | |
| 2003/0074368 A1* | 4/2003 | Schuetze | G06F 16/5846 |
| 2005/0038698 A1 | 2/2005 | Lukose et al. | |
| 2005/0134589 A1 | 6/2005 | Heer et al. | |
| 2007/0050844 A1* | 3/2007 | Lebel | G06F 11/3414 726/13 |
| 2007/0064805 A1* | 3/2007 | Carrig | H04N 19/46 375/240.16 |
| 2007/0276790 A1 | 11/2007 | Walsh et al. | |
| 2008/0004878 A1* | 1/2008 | Weng | G06K 9/6228 704/256 |
| 2008/0015878 A1 | 1/2008 | Feng et al. | |
| 2008/0243815 A1 | 10/2008 | Chan et al. | |
| 2008/0270946 A1 | 10/2008 | Risch et al. | |
| 2010/0312624 A1 | 12/2010 | Bilenko | |
| 2011/0099066 A1 | 4/2011 | Bilenko et al. | |
| 2011/0196741 A1 | 8/2011 | Gupta et al. | |
| 2012/0016741 A1 | 1/2012 | Brunsman et al. | |
| 2012/0143693 A1 | 6/2012 | Chung et al. | |
| 2013/0159331 A1* | 6/2013 | Zhang | G06Q 30/0261 707/758 |
| 2014/0032665 A1 | 1/2014 | Weinberg et al. | |
| 2014/0337339 A1* | 11/2014 | Li | G06Q 10/109 707/737 |
| 2015/0005030 A1 | 1/2015 | Pennanen et al. | |
| 2015/0058121 A1 | 2/2015 | Navin | |
| 2016/0021213 A1* | 1/2016 | Ruan | G06Q 50/01 709/204 |

OTHER PUBLICATIONS

Dynamic Search Ads 1 06.08.2014 https://support.google.com/adwords/answer/2471185.
Dynamic Search Ads 2 06.08.2014 https://www.youtube.com/watch?v=qj76EpYRZ7M.
International Preliminary Report on Patentability with regard to PCT/IB2015/057701 dated Sep. 19, 2016.

* cited by examiner

METHOD OF AND SYSTEM FOR PROCESSING ACTIVITY INDICATIONS ASSOCIATED WITH A USER

CROSS-REFERENCE

The present application is a U.S. national stage entry of International Patent Application No. PCT/IB2015/057701, filed on Oct. 8, 2015, entitled "METHOD OF AND SYSTEM FOR PROCESSING ACTIVITY INDICATIONS ASSOCIATED WITH A USER" which claims priority to Russian Patent Application No 2015111633, filed Mar. 31, 2015, entitled "METHOD OF AND SYSTEM FOR PROCESSING ACTIVITY INDICATIONS ASSOCIATED WITH A USER" the entirety of which is incorporated herein.

FIELD

The present technology relates to systems and methods for processing activity indications associated with a user. In particular, the systems and methods aim at associating items based, at least partially, on activity indications associated with a user.

BACKGROUND

Various websites and online services analyze the behaviour of users of their services in order to select relevant content to be presented to those same users or to other users. For example, some online stores such as Yandex.Market™, Amazon™ or eBay™ may keep track of users activities by monitoring activity indications associated with such users. The activity indications may be behavioural information regarding the users such as, but without being limitative, lists of items viewed by a user during a navigation session, selections of buttons or webpage hyperlinks, submissions of search queries to search engines or other online services and/or dwell times with respect to various web resources. The information may be stored in a format that facilitates analysis and extrapolation of estimated user interests and/or anticipated user interests and/or anticipated user behaviours.

Generally, different types of information are stored in a respective format suitable for representing that type of information. For example, a web-browsing history of a user may be represented as a catalogue of Uniform Resource Identifiers (URIs) of various network resources having been visited by the users. Each URI may be accompanied by a timestamp indicative of a date and time that the network resource was visited and/or a dwell time indicative of the amount of time the user presumably spent viewing the network resource. A geographical history of a user, on the other hand, may be represented by a series of geographical coordinates associated with the user, such as position data collected by a mobile device associated with the user and/or "check-ins" reported by the user to one or more online services, such as social networking services. As user events of different types are conventionally represented using different information formats, they may be difficult to compare and analyze. The Applicant of the present application has developed an improved method and system enabling analysis of vectors representative of user activity indications. Such method and system is detailed in PCT Patent Application No. PCT/IB2015/050791 (the "'791 Application" hereinafter), filed Feb. 2, 2015 entitled "METHOD FOR ESTIMATING USER INTERESTS" claiming priority from Russian Patent Application No. 2014136907 (the "'907 Application" hereinafter), filed Sep. 12, 2014, entitled "METHOD FOR ESTIMATING USER INTERESTS" the entirety of which are incorporated herein by reference in jurisdictions allowing such incorporation by reference.

Even though analysis of vectors representative of user activity indications has been rendered possible by the method and system of the Applicant, use of user activity indications, whether generated in accordance with the method and system of the Applicant or not, in the context of associating user activity indications with items may be improved.

In the present context, an "item" or "items" may refer to a product and/or service to be associated with a user. Such association may be made in the context of targeted advertisement to a user aiming at identifying an item or items that may be relevant to the user. It should be understood that an "item" or "items" may refer to a banner relating to a product and/or service to be associated with a user. In addition, an "item" or "items" may also refer to a cluster of products and/or services and/or a cluster of banners relating to products and/or services. Other variations as to what an "item" or "items" may refer to will become apparent to the person skilled in the art of the present technology such as, but without being limitative, content or a cluster of contents to be presented to a user.

SUMMARY

Under conventional approaches, in order to set up an advertisement campaign, a product and/or service merchant may create banners to advertise a product and/or a service. In some instances, the banner may comprise an image (and/or a series of images defining a video sequence) and/or text associated with the image. Under a conventional approach, a selection of one or more keywords associated with the banner is required in order for computer-implemented systems to be able to associate the banner with a user based on user activity indications. In most instances, the selection of the one or more key words is made manually which may be cumbersome, not cost-efficient and may result in inaccuracies. In addition, such an approach does not allow capitalizing on previous associations between banners and user activity indications.

There is therefore a need for improved methods and systems aiming at associating items based, at least partially, on activity indications associated with a user. In particular, there is a need to benefit from data that may be automatically generated by a computer-implemented system by processing activity indications associated with a user to generate patterns reflecting associations between items. Such data may then be used to reduce or avoid manual tagging of items (e.g., banners, content) with keywords and improve accuracy of associations between user activity indications and items. Such data may also be leveraged in a context of machine learning to reduce or avoid manual classification and/or association of items while improving accuracy of the classification and/or association.

The present technology arises from an observation made by the inventor(s) that an activity feature vector associated with activity indications of a user may be used in combination with a text feature vector associated with a text stream of a first item and/or in combination with an image feature vector associated with an image file of the first item to identify a second item to be associated with the user.

Thus, in one aspect, various implementations of the present technology provide a computer-implemented method of associating past activity indications associated with past activities of a user with items, the method executable by a server, the method comprising:

accessing, from a non-transitory computer-readable medium, the past activity indications associated with the past activities of the user at at least one network resource;

accessing, from the non-transitory computer-readable medium, item indications associated with the items, at least one of the item indications being associated with a text stream and at least one of the item indications being associated with an image file;

generating past activity features associated with the past activity indications;

determining a past activity feature vector corresponding to the past activity features;

generating text features associated with the text stream;

determining a text feature vector corresponding to the text features;

mapping the past activity feature vector and the text feature vector in a first multidimensional space to generate a text feature space, the text feature space reflecting associations between the past activity indications and the text stream;

generating image features associated with the image file;

determining an image feature vector corresponding to the image features;

mapping the past activity feature vector and the image feature vector in a second multidimensional space to generate an image feature space, the image feature space reflecting associations between the past activity indications and the image file;

combining the text feature space and the image feature space to generate a user item space, the user item space reflecting associations between the past activity indications and the items; and storing, in the non-transitory computer-readable medium, the user item space.

In some implementations, the method further comprises receiving current activity indications associated with current activities of the user at a network resource; and identifying one of the items to be associated with the user based on an analysis of the user item space and the current activity indications.

In some further implementations, the analysis of the user item space and the current activity indications comprises an analysis of a distance between the one of the items and a representation of the current activity indications in the user item space.

In some implementations, the method further comprises receiving current activity indications associated with current activities of the user at a network resource; generating current activity features associated with the current activity indications; determining a current activity feature vector corresponding to the current activity features; and mapping the user item space and the current activity feature vector in a third multidimensional space to identify one of the items to be associated with the user.

In some further implementations, identifying the one of the items to be associated with the user is based on a distance between the one of the items and a location of the current activity feature vector in the user item space.

In some implementations, the method further comprises causing an electronic device associated with the user to display at least one of the text stream and the image file associated with the identified one of the items.

In some further implementations, the first multidimensional space and the second multidimensional space define a same multidimensional space.

In some implementations, the first multidimensional space, the second multidimensional space and the third multidimensional space define a same multidimensional space.

In some further implementations, the items comprise a first item previously presented to the user and a second item not previously presented to the user.

In some implementations, mapping the past activity feature vector and the text feature vector comprises mapping the past activity feature vector and a first text feature vector associated with the first item in the first multidimensional space; and mapping the first text feature vector and a second text feature vector associated with the second item in the first multidimensional space.

In some further implementations, the items are associated with at least one of a product and a service.

In some implementations, at least one of determining the text feature vector, determining the image feature vector and determining the past activity vector comprise conducting a neural network analysis.

In some further implementations, determining the current activity vector comprises conducting a neural network analysis.

In some implementations, a distance between a first one of the items and a second one of the items represented in at least one of the text feature space, the image feature space and the user item space reflects whether the first one of the items and the second one of the items were previously presented to the user during a same navigation session of the network resource.

In some further implementations, a distance between a first one of the items and a second one of the items represented in at least one of the text feature space, the image feature space and the user item space reflects a number of navigation sessions separating the presentation of the first one of the items to the user from the presentation of the second one of the items to the user.

In some implementations, past activity indications comprise entries of a web browser log.

In some further implementations, a first one of the text stream is associated with a first network resource and a second one of the text stream is associated with a second network resource.

In other aspects, various implementations of the present technology may provide a computer-implemented method of associating a first item and a second item, the method executable by a server, the method comprising:

accessing, from a non-transitory computer-readable medium, past activity indications associated with past activities of the user at at least one network resource;

accessing, from the non-transitory computer-readable medium, the first item indication associated with a first item previously presented to the user;

accessing, from the non-transitory computer-readable medium, the second item indication associated with a second item not previously presented to the user;

generating past activity features associated with the past activity indications;

determining a past activity feature vector corresponding to the past activity features;

generating first item features associated with the first item;

determining a first item feature vector corresponding to the first item features;

mapping the past activity feature vector and the first item vector in a first multidimensional space to generate an item space, the item space reflecting associations between past activity indications and the first item;

storing, in the non-transitory computer-readable medium, the item space; and mapping the second item in the item space based on analysis of data associated with the first item and data associated with the second item.

In some implementations, the method further comprises accessing, from the non-transitory computer-readable medium, an image file associated with one of the first item and the second item; generating image features associated with the image file; determining an image feature vector corresponding to the image features; mapping the past activity feature vector and the image feature vector in the first multidimensional space to generate an image feature space, the image feature space reflecting associations between past activity indications and the image file; and combining the item space and the image feature space to generate an item image space.

In some further implementations, the method further comprises receiving current activity indications associated with current activities of the user at a network resource; and determining that the second item is to be associated with the user based on an analysis of a location of the second item in the item space and the current activity indications.

In some implementations, the method further comprises receiving current activity indications associated with current activities of the user at a network resource; generating current activity features associated with the current activity indications; determining a current activity feature vector corresponding to the current activity features; and mapping the item space and the current activity feature vector in the first multidimensional space to determine whether the second item is to be associated with the user.

In other aspects, various implementations of the present technology provide a non-transitory computer-readable medium storing program instructions for processing activity indications associated with a user, the program instructions being executable by a processor of a computer-based system to carry out one or more of the above-recited methods.

In other aspects, various implementations of the present technology provide a computer-based system, such as, for example, but without being limitative, an electronic device comprising at least one processor and a memory storing program instructions for processing activity indications associated with a user, the program instructions being executable by one or more processors of the computer-based system to carry out one or more of the above-recited methods.

In the context of the present specification, unless expressly provided otherwise, an "electronic device", an "electronic device", a "server", a, "remote server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
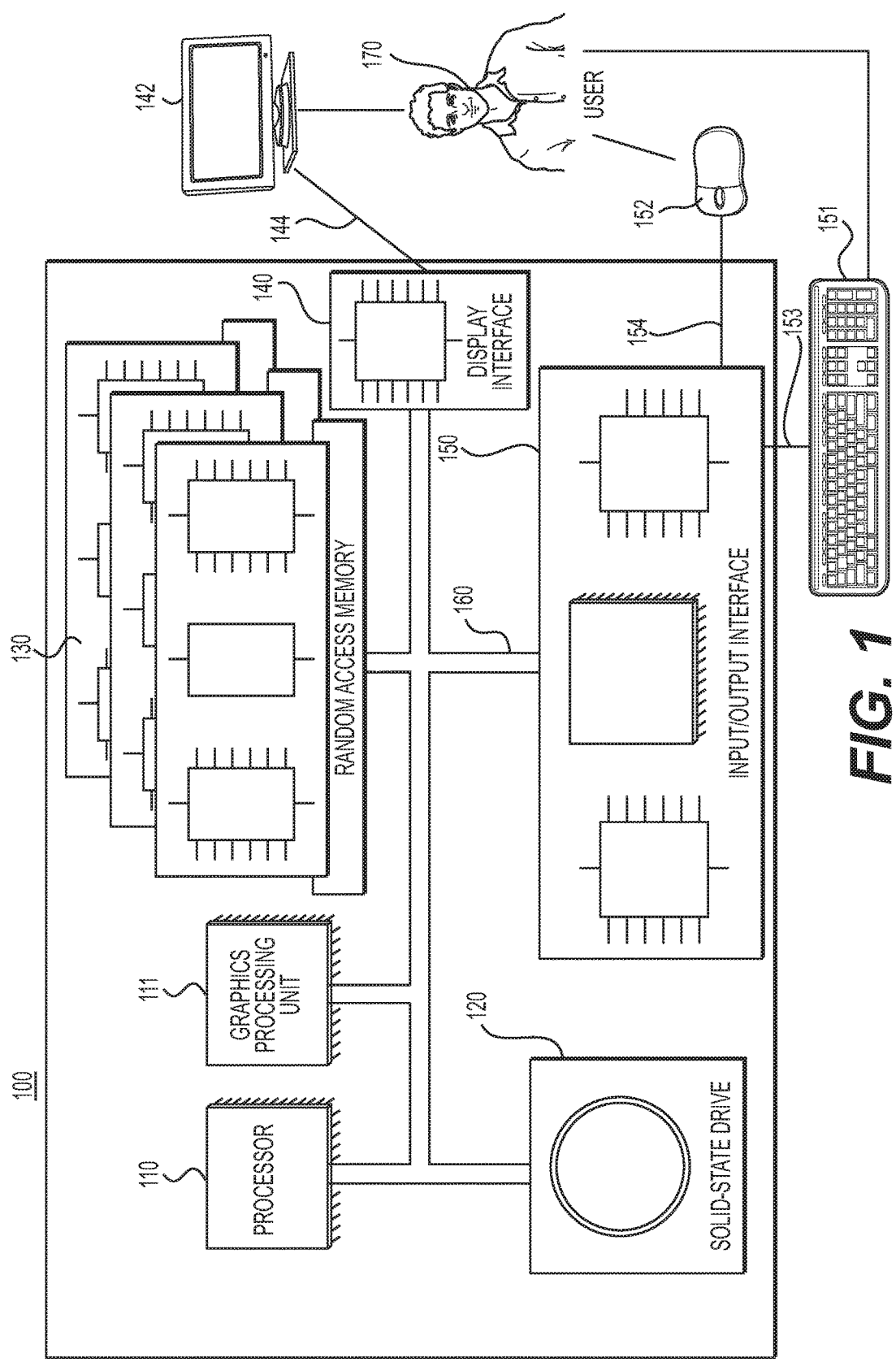
FIG. 1 is a diagram of a computer system suitable for implementing the present technology and/or being used in conjunction with implementations of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a computer system 100 suitable for use with some implementations of the present technology, the computer system 100 comprising various hardware components including one or more single or multi-core processors collectively represented by processor 110, a graphics processing unit (GPU) 111, a solid-state drive 120, a random access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled. The display interface 140 may be coupled to a monitor 142 (e.g. via an HDMI cable 144) visible to a user 170, and the input/output interface 150 may be coupled to a touchscreen (not shown), a keyboard 151 (e.g. via a USB cable 153) and a mouse 152 (e.g. via a USB cable 154), each of the keyboard 151 and the mouse 152 being operable by the user 170.

According to implementations of the present technology, the solid-state drive 120 stores program instructions suitable for being loaded into the random access memory 130 and executed by the processor 110 and/or the GPU 111 for processing activity indications associated with a user. For example, the program instructions may be part of a library or an application.

Figure 2:
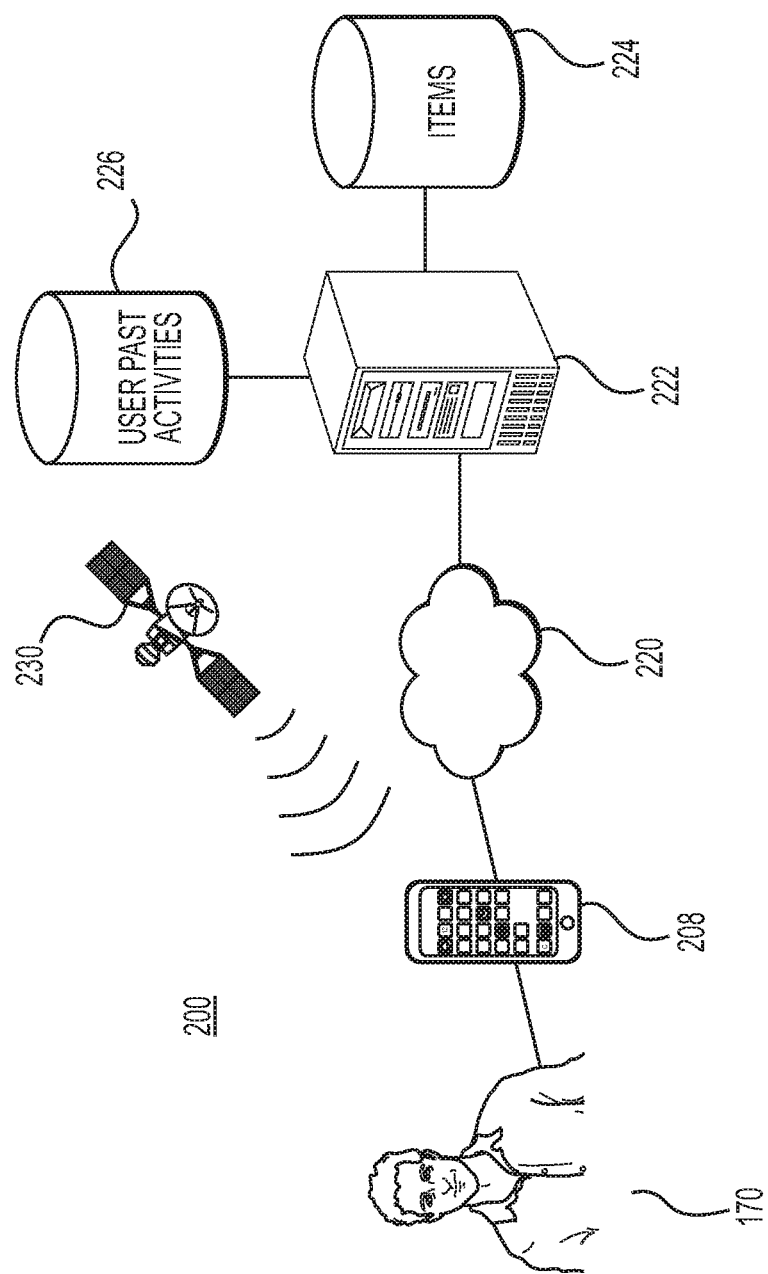
FIG. 2 is a diagram of a networked computing environment in accordance with an embodiment of the present technology.

In FIG. 2, there is shown a networked computing environment 200 suitable for use with some implementations of the present technology, the networked computing environment 200 comprising an electronic device 208 (also referred to as a "client device", an "electronic device" or an "electronic device associated with the user"), a server 222 (also referred to as a "remote server") in communication with the electronic device 208 via a network 220 (e.g., the Internet) enabling these systems to communicate and a GPS satellite 230 transmitting a GPS signal to the electronic device 208.

The implementation of the electronic device 208 is not particularly limited, but as an example, the electronic device 208 may interact with the server 222 by receiving input from the user 170 and receiving and transmitting data via the network 220. The electronic device 208 may be, for example and without being limitative, a desktop computer, a laptop computer, a smart phone (e.g. an Apple iPhone™ or a Samsung Galaxy SS™), a personal digital assistant (PDA) or any other device including computing functionality and data communication capabilities. The electronic device 208 may comprise internal hardware components including one or more single or multi-core processors collectively referred to herein as processor 110, a GPU 111 and a random access memory 130, each of which is analogous to the like-numbered hardware components of computer system 100 shown in FIG. 1, as well as a network interface (not depicted) for communicating with the server 222. The electronic device 208 may also comprise a GPS receiver (not depicted) for receiving a GPS signal from one or more GPS satellites, such as the satellite 230.

In one embodiment, the electronic device 208 displays content from the server 222 by processing data received from the server 222. In various embodiments, the electronic device 208 executes a visualisation interface to display content processed by the server 222 to the user 170 through a browser application (not shown) and/or through a dedicated visualisation application (not shown) preinstalled on the electronic device 208.

In an exemplary embodiment of the present technology, the visualisation interface may enable the user 170 to receive and display content as a result of the server 222 processing data relating to activity indications associated with the user 170. In some embodiments, the visualisation interface may cause the electronic device 208 and/or the server 222 to generate data relating to activity indications associated with the user 170. As the person skilled in the art of the present technology will appreciate, data relating to activity indications (also referred to as "past activity indications") may take various form. The activity indications may be behavioural information regarding the user 170 such as, but without being limitative, lists of items viewed by the user 170 during one or more navigation sessions, selections of buttons or webpage hyperlinks, submissions of search queries to search engines or other online services and/or dwell times with respect to various web resources. In some embodiments, the activity indications may be associated with items. More information regarding such association will be provided in connection with the description of FIG. 3. The activity information may be generated and/or stored at various location such as, but without being limitative, the electronic device 208, the server 222 and/or in the past activities database as raw data and/or in a format that may facilitates analysis and extrapolation of estimated user interests and/or anticipated user interests and/or anticipated user behaviours.

As a person skilled in the art of the present technology will appreciate, as the present technology relates to the processing of activity indications associated with the user 170, multiple applications may be envisioned. Such applications may comprise, without being limitative, (i) generation of targeted advertisement banners and/or content not relating to a commercial activities; (ii) analysis of user patterns to define advertisement campaigns; (iii) automatic classification and/or tagging of advertisement banners and/or content without (or at least with limited) human intervention; and/or (v) automatic learning and training by computer-implemented systems. Multiple other applications may also be envisioned without departing from the scope of the present technology and are therefore not limitative.

As a result of the multiple applications that may be envisioned, the visualisation interface may, in some embodiments, take various forms such as, but without being limitative, a web browser, an email interface, a search engine interface and/or an electronic store interface.

In one embodiment, a communication channel (not depicted) between the electronic device 208 and the server 222 may be established to allow data exchange. Such data exchange may occur on a continuous basis or, alternatively, upon occurrence of certain events. For example, in the context of gathering activity indications, a data exchange may occur as a result of the user 170 interacting with the visualisation interface, for example but without being limitative, by having the electronic device 208 sending one or more streams of data relating to activity indications to the server 222 and receiving in return one or more items to be presented to the user 170.

As detailed above, in some embodiments, the communication channel may be created further to the electronic device 208 sending a request to obtain information from the server 222 (e.g., data to be displayed in a web browser, data relating to emails . . . ). In some other instances, the electronic device 208 may include a cookie (not shown) that contains data indicating whether the user 170 of the electronic device 208 is logged into the server 222. The cookie may indicate whether the user 170 is involved in an active session where the electronic device 208 exchanges data with the server 222, providing that the user 170 has an account associated with the server 222. Once the communication channel is established between the electronic device 208 and the server 222, data relating to the activity indications may be sent by the electronic device 208. As a person skilled in the art of the present technology will appreciate, many variations as to how data is transferred between the electronic device 208 and the server 222 may be envisioned without departing from the scope of the present technology.

In another embodiment, the data relating to the activity indications may be previously stored in a memory of the server 222 such as in the solid-state drive 120 and/or in a users past activities database 226. In such an embodiment, no communication channel is to be established between the electronic device 208 and the server 222 as the data has been previously stored in the memory of the server 222 and/or in the users past activities database 226. Naturally, even within those embodiments where the data relating to the activity indications is stored in the memory of the server 222 and/or in the user past activities database 226, the communication channel may be established (for example, to download updates and the like).

In yet another embodiment, the data relating to the activity indications may be previously stored in a memory of the electronic device 208 such as in the solid-state drive 120. In another embodiment, an item or a list of items may be previously stored in the memory of the electronic device 208. In such an embodiment, no communication channel is to be established between the electronic device 208 and the server 222 as the data has been previously stored in the memory of the electronic device 208, for example, upon downloading and installing the visualisation application on the electronic device 208. In yet another embodiment, data relating to the activity indications of the user 170 may be stored locally on the electronic device 208 without being transmitted to the server 222. Naturally, even within those embodiments where the data relating to the activity indications and/or the items are stored in the memory of the electronic device 208, the communication channel may be established (for example, to download updates and the like).

Once received by the electronic device 208 and/or accessed from the memory of the electronic device 208 and/or received by the server 222 and/or accessed from the memory of the server 222 and/or accessed from the users past activities database 226 and/or accessed from an items database 224, the data relating to the past activities and/or the items may be processed, for example by the processor 110 of the electronic device 208 and/or the processor 110 of the server 222. Instructions to carry out the processing of the data may be implemented through a software module controlled by the visualisation interface. Alternatively, the software module may be controlled independently from the visualisation interface (e.g., may be controlled by an operating system of the electronic device 208 and/or an operating system of the server 222). In other embodiments of the present technology, the instructions to carry out the processing may be implemented through a dedicated module (software and/or hardware) or a non-dedicated module (software and/or hardware) without departing from the scope of the present technology.

The electronic device 208 is coupled to the network 220 via a communication link (not numbered). In some non-limiting embodiments of the present technology, the network can be implemented as the Internet. In other embodiments of the present technology, the network 220 can be implemented differently, such as any wide-area communications network, local-area communications network, a private communications network and the like.

How the communication link is implemented is not particularly limited and will depend on how the electronic device 208 is implemented. Merely as an example and not as a limitation, in those embodiments of the present technology where the electronic device 208 is implemented as a wireless communication device (such as a smart-phone), the communication link can be implemented as a wireless communication link (such as but not limited to, a 3G communications network link, a 4G communications network link, a Wireless Fidelity, or WiFi®, Bluetooth® and the like). In those examples, where the electronic device 208 is implemented as a notebook computer, the communication link can be either wireless (such as the Wireless Fidelity, or WiFi®, Bluetooth® and the like) or wired (such as an Ethernet based connection).

It should be expressly understood that implementations for the electronic device 208, the communication link and the network 220 are provided for illustration purposes only. As such, those skilled in the art will easily appreciate other specific implementational details for the electronic device 208, the communication link and the network 220. As such, by no means, examples provided herein above are meant to limit the scope of the present technology.

Also coupled to the network 220 is the server 222 on which a service for processing activity indications associated with one or more users (such as the user 170) may be hosted. The server 222 can be implemented as a conventional computer server. In an example of an embodiment of the present technology, the server 222 can be implemented as a Dell™ PowerEdge™ Server running the Microsoft™ Windows Server™ operating system. Needless to say, the server 222 can be implemented in any other suitable hardware and/or software and/or firmware or a combination thereof. In the depicted non-limiting embodiment of present technology, the server 222 is a single server. In alternative non-limiting embodiments of the present technology, the functionality of the server 222 may be distributed and may be implemented via multiple servers.

The implementation of the server 222 is well known to the person skilled in the art of the present technology. However, briefly speaking, the server 222 comprises a communication interface (not depicted) structured and configured to communicate with various entities (such as the electronic device 208, for example and other devices potentially coupled to the network 220) via the network 220. The server 222 further comprises at least one computer processor (not depicted) operationally connected with the communication interface and structured and configured to execute various processes to be described herein.

The server 222 may be communicatively coupled (or otherwise has access) to a server implementing a search engine (not shown). In some embodiments, the server 222 may implement or be coupled to a server implementing processing of activity indications and/or processing of items to be associated based on activity indications. In some embodiments, the server 222 may implement or be coupled to a server implementing generation of targeted advertisement banners and/or content not relating to a commercial activities; analysis of user patterns to define advertisement campaigns; automatic classification and/or tagging of advertisement banners and/or content without (or at least with limited) human intervention; and/or automatic learning and training by computer-implemented systems. The server 222 can be sometimes referred to as a "activity indications processing server", a "past activity indications processing server", a "items processing server", a "data server", a "a targeted advertisement server", an "email server", a "search server" or a "content extraction server".

The general purpose of the server 222 is to process activity indications in connection with items to generate associations between items. What follows is a description of one non-limiting embodiment of the implementation for the server 222. However, it should be understood that there is a number of alternative non-limiting implementations of the server 222 possible. It should be also expressly understood that in order to simplify the description presented herein below, the configuration of the server 222 has been greatly simplified. It is believed that those skilled in the art will be able to appreciate implementational details for the server 222 and for components thereof that may have been omitted for the purposes of simplification of the description.

Generally speaking the purpose of the server 222 is to (i) receive activity indications from the electronic device 208; (ii) retrieve data from the users past activity database 226 and/or the items database 224; (iii) process activity indications and/or item indications associated with items (e.g., banners and/or content); and (iv) transmit and/or store items associated with the user 170. How the server 222 is configured to receive the request, retrieve data and transmit data is not particularly limited. Those skilled in the art will appreciate several ways and means to execute the receiving of the activity indications, the retrieving of the data, the processing of the data and the transmitting of the data and as such, several structural components of the server 222 will only be described at a high level. More details regarding how activity indications in connection with items and associations between items are processed will be provided in connection with the description of FIGS. 5 to 13.

In one embodiment, the server 222 may be configured to receive activity indications from the electronic device 208. In some embodiments, past activity indications of the user 170 may also be received. In yet some other embodiments, the past activity indications may not be received per se but an indication indicative of such past activity may instead be received. The indication indicative of such past activity may then be used by the server 222 to retrieve the past activity indications. In an embodiment, the retrieving of the past activity indications may be conducted by accessing the users past activities database 226. How the retrieving of the past activity indications is made is not particularly limited.

In an embodiment, the server 222 may retrieve data from the users past activities database 226 and/or the items database 224 as the case may be and/or as the need may be. The retrieved data may include raw data relating to activity indications, pre-processed data relating to activity indications, data relating to items such as text streams and/or images related to one or more items. In some embodiments of the present technology, the retrieved data may be processed by the server 222 to identify an item to be presented to the user 170. In some embodiments, the item may be transmitted to the electronic device 208. In some other embodiments, the item may be stored in a memory of the server 222 and/or the items database 224.

The users past activities database 226 is communicatively coupled to the server 222 and may comprise data representing one or more entries. The description of the users past activities database 226 which follows will be made while referring to both FIGS. 2 and 3. How the users past activities database 226 is structured is not particularly limitative and many variations may become apparent to a person skilled in the art of the present technology. In one embodiment, the users past activities database 226 may comprise data structured so as to contain information allowing defining behavioural information regarding one or more users such as the user 170. In some embodiments, the users past activities database 226 may be dynamically populated so as to accumulate large volume of data associated with past activities of multiple users.

As an example, the users past activities database 226 may comprise entries relating to a first user "User #1", a second user "User #2" and a third user "User #3". The entries relating to the first user "User #1" may comprise information relating to one or more browsing sessions such as a first browsing session "Session #1" and a second browsing session "Session #2". The entry relating to the second user "User #2" may comprise information relating to one or more browsing sessions such as a third browsing session "Session #10". The entry relating to the third user "User #3" may comprise information relating to one or more browsing sessions such as a fourth browsing session "Session #n". As the person skilled in the art of the present technology will appreciate, the number of entries and browsing sessions associated with a user is not limitative and numerous variations may be envisioned without departing from the scope of the present technology. Even though reference is made to browsing sessions, this shall not be construed as being limitative.

Figure 3:
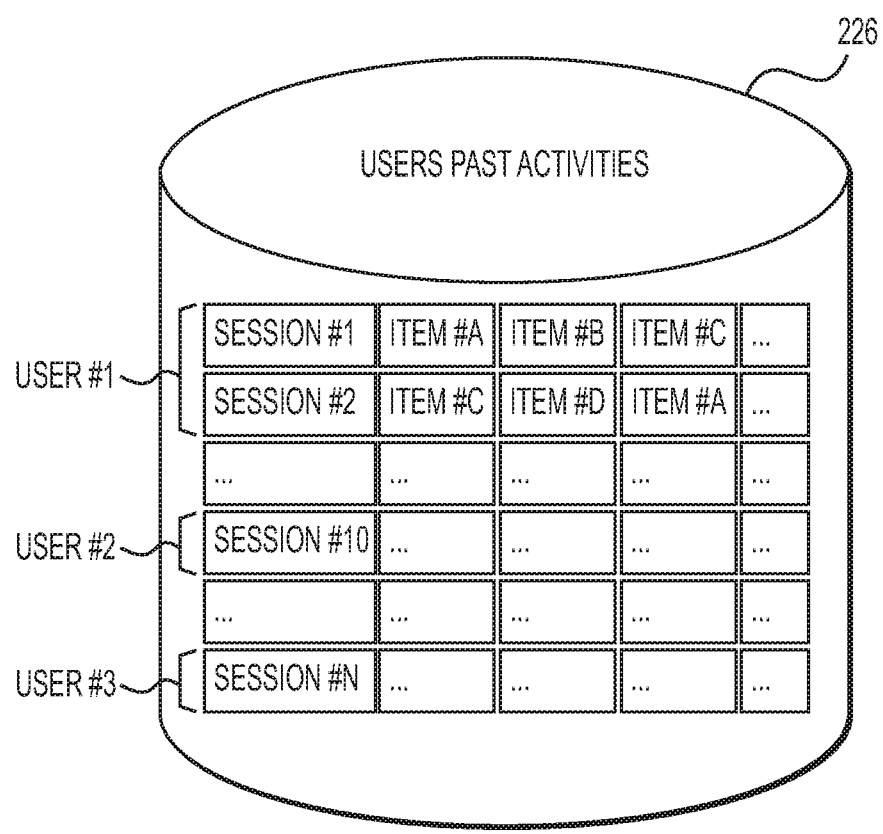
FIG. 3 is a diagram illustrating entries of a user past activities database in accordance with an embodiment of the present technology.

In the example detailed at FIG. 3, the first browsing session "Session #1" may relate to a browsing session of the first user "User #1" during which the first user "User #1" has visited "Item #a", "Item #b" and "Item #c". The first browsing session "Session #1" may also be associated with additional items. In an embodiment, the first browsing session "Session #1" may be associated with a navigation session of the first user "User #1" on a web resource, such as, but not limited to, an e-commerce platform (also referred to as an "online store"). Such e-commerce platform may be, but without being limitative, one of Yandex.Market™, Amazon™ and/or eBay™. The "Item #a", "Item #b" and "Item #c" may reflect products and/or services visited by the first user "User #1". The first browsing session "Session #1" may also be indicative of an order in which the "Item #a", "Item #b" and "Item #c" have been visited. In this example, first browsing session "Session #1" may be indicative that the first user "User #1" has first visited the "Item #a", then the "Item #b" and finally the "Item #c". It should be understood that the first browsing session "Session #1" may also be indicative of a navigation session on multiple e-commerce platforms. In an example, the first browsing session "Session #1" may be indicative of the first user "User #1" visiting the "Item #a" on a first e-commerce platform (e.g., Yandex.Market™), then the "Item #b" on a second e-commerce platform (e.g., Amazon™) and finally the "Item #c" on a third e-commerce platform (e.g., eBay™). Still referring to FIG. 3, the second browsing session "Session #2" may be indicative of the first user "User #1" visiting an "Item #c", an "Item #d" and the "Item #a". As a result, an analysis of the first browsing session "Session #1" and the second browsing session "Session #2" may determine that the "Item #a" has been visited by the first user "User #1" twice i.e., a first time during the first browsing session "Session #1" and a second time during the second browsing session "Session #2".

As the person skilled in the art of the present technology will appreciate, the data entries depicted in FIG. 3 are merely provided to exemplify how behavioural information regarding a user may be stored but should not be construed as being limitative. The information contained in the users past activities database 226 may be stored in multiple format and may contain various type of behavioural information such as, but without being limitative, lists of items viewed by a user during a navigation session, selections of buttons or webpage hyperlinks, submissions of search queries to search engines or other online services and/or dwell times with respect to various web resources. The information may be stored in a format that facilitates analysis and extrapolation of estimated user interests and/or anticipated user interests and/or anticipated user behaviours. In some embodiments, different types of information are stored in a respective format suitable for representing that type of information. For example, a web-browsing history of the user 170 may be represented as a catalog of Uniform Resource Identifiers (URIs) of various network resources having been visited by the users. Each URI may be accompanied by a timestamp indicative of a date and time that the network resource was visited and/or a dwell time indicative of the amount of time the user presumably spent viewing the network resource. A geographical history of a user, on the other hand, may be represented by a series of geographical coordinates associated with the user 170, such as position data collected by a mobile device associated with the user (e.g., based on the GPS signal transmitted by the GPS satellite 230) and/or "check-ins" reported by the user to one or more online services, such as social networking services. Even though user events of different types are conventionally represented using different information formats, they may be processed in accordance with the method and system enabling analysis of vectors representative of user activity indications developed by the Applicant and described in the '791 Application and the '907 Application.

In addition, even though the users past activities database 226 is represented with data entries relating to users past activities, other variations are also possible. The users past activities database 226 may comprise entries relating to current and/or future users activities. In an example, the current users activities may be received from the electronic device 208 and, upon being received by the server 222, be stored in the users past activities database 226. In another example, the future users activities may be generated by the server 222 based on users past activities and/or users current activities. In some embodiments, a data entry relating to an item, such as the "Item #a" may comprise information relating to the item and/or a link to a data collection wherein information relating to the item is stored, such as, for example, but without being limitative, the items database 224.

The description of the items database 224 which follows will be made while referring to both FIGS. 2 and 4. The items database 224 is communicatively coupled to the server 222 and may comprise data representing one or more entries. How the items database 224 is structured is not particularly limitative and many variations may become apparent to a person skilled in the art of the present technology. In some embodiments, the items database 224 may be dynamically populated so as to accumulate large volume of data associated with items associated with one or more service platforms such as, but without being limited thereto, e-commerce platforms. In one embodiment, the items database 224 may comprise data structured so as to contain information relating to one or more items. As previously mentioned, an "item" or "items" may refer to a product and/or a service to be associated with a user, such as the user 170. Such association may be made in the context of targeted advertisement aiming at identifying an item or items that may be relevant to the user 170. In some embodiments, the items database 224 may include items associated with advertisement campaigns aiming a identifying and presenting items that may be most likely relevant to a particular user. In some embodiments, the "item" or "items" may refer to banners relating to a product and/or a service to be associated with the user 170. The "item" or "items" may also refer to a cluster of products and/or services and/or a cluster of banners relating to products and/or services. Other variations as to what the "item" or "items" may refer to will become apparent to the person skilled in the art of the present technology such as, but without being limitative, content or one or more clusters of items or contents to be presented to the user 170. For example, but without being limitative, a first item cluster may comprise a collection of items relating to vacation packages and a second item cluster may comprise a collection of items relating to computing devices. In some embodiments, an item may refer to a cluster comprising one or more items or to the one or more items itself.

Figure 4:
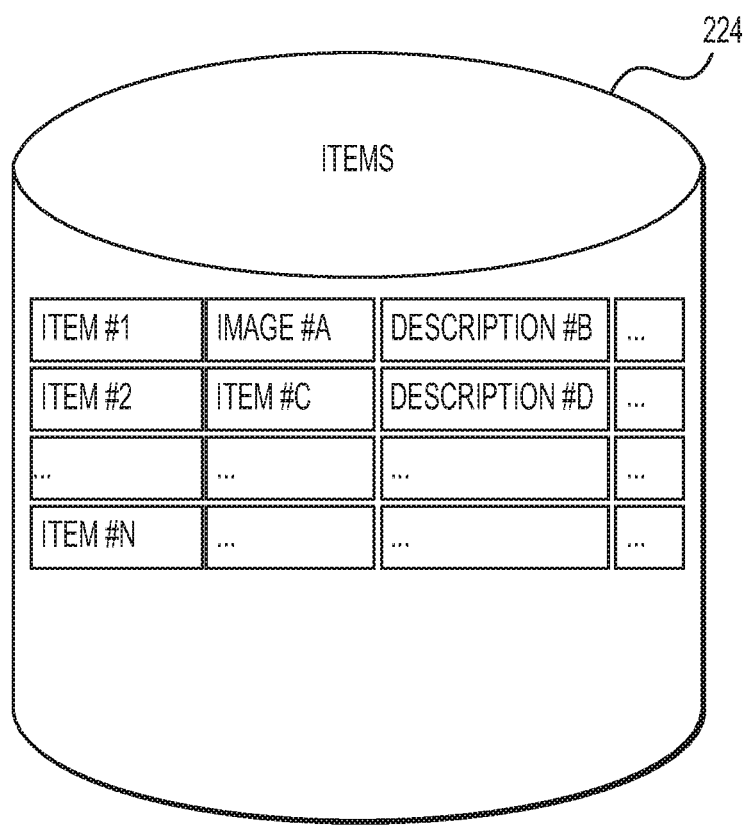
FIG. 4 is a diagram illustrating entries of an items database in accordance with an embodiment of the present technology.

Referring to FIG. 4, the items database 224 may comprise entries relating to a first item "Item #1", a second item "Item #2" and a third item "Item #n". In some embodiments, the first item "Item #1" may correspond to the item "Item #a" contained in the users past activities database 226. Similarly, the second item "Item #2" may correspond to the item "Item #b" contained in the users past activities database 226. In the example depicted at FIG. 4, the first item "Item #1" is associated with a first image file referred to as "Image #a" and a first description referred to as "Description #b" Similarly the second item "Item #2" is associated with a second image file referred to as "Image #c" and a second description referred to as "Description #d". In some embodiments, the "Image #a" and the "Image #c" may each comprise an image file in a format allowing storage and processing by a computer-implemented system such as the server 222. In some embodiments, the format may be one of JPEG format, JFIF format, JPEG 200 format, Exif format, TIFF format, GIF format, BMP format. Other formats will become apparent to the person skilled in the art of the present technology and may be used without departing from the scope of the present technology. In some embodiments, the "Description #b" and the "Description #d" may each comprise a text stream in a format allowing storage and processing by a computer-implemented system such as the server 222. In yet some embodiments, the items database 224 may comprise additional parameters and/or files such as audio files and/or video files (e.g., in a context of wherein an item is associated with a dynamic banner displaying a video sequence to the user 170). In some embodiments, the first item "Item #1", the second item "Item #2" and the third item "Item #n" may be associated with banners and/or product and/or service description cards. An example of such banners is provided at FIG. 5 wherein a banner 502 is depicted. As the person skilled in the art will appreciate, the items contained in the items database 224 may not be limited to banners and/or product and/or service description cards. Multiple variations may be envisioned without departing from the scope of the present technology.

Figure 5:
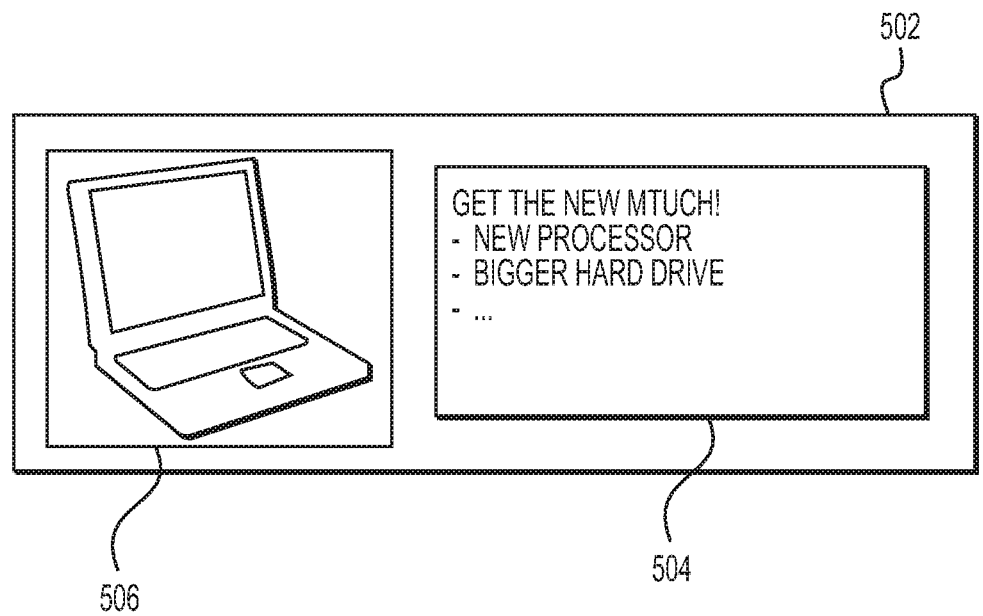
FIG. 5 is a diagram illustrating a banner comprising an image and a text stream in accordance with an embodiment of the present technology.

Turning now to FIG. 5, the banner 502 is depicted. The banner 502 comprises an image file 506 and a text stream 504. In some embodiments, the banner 502 may represent information associated with the first item "Item #1" stored in the items database 224. In such embodiments, the image file 506 may correspond to the "Image #a" and the text stream 504 may correspond to the "Description #b". In the example of FIG. 5, the image file 506 represents a computing device and the text stream contains a textual description of features of the computing device. In this example, the features comprise an advertisement message "Get the new mTuch" and a list of specifics such as "New processor" and "Bigger hard drive". Other features may also be comprised in the text stream 504.

Turning now to FIGS. 6 to 13, a method of processing activity indications associated with a user and processing data relating to items in accordance with the present technology will be exemplified.

Figure 6:
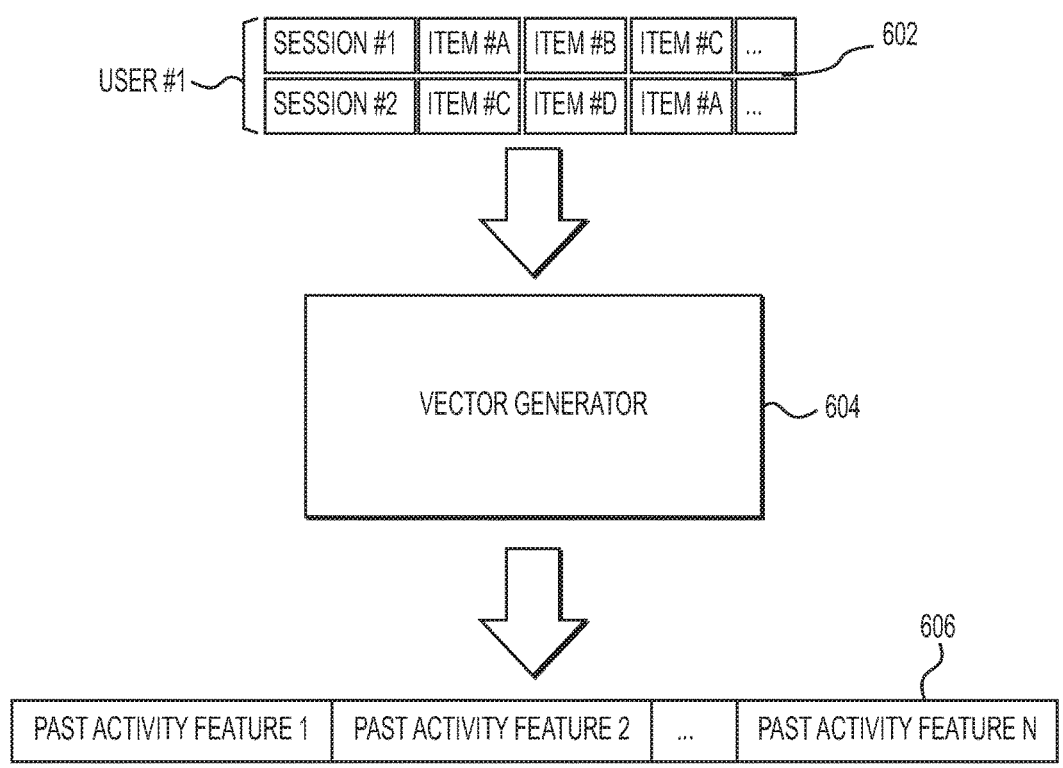
FIG. 6 is a diagram illustrating entries of the user past activities database processed by a vector generator to generate a past activity feature vector in accordance with an embodiment of the present technology.

FIG. 6 depicts past activity indications 602 being processed by a vector generator 604 in order to determine a past activity feature vector 606. In the example of FIG. 6, the past activity indications 602 may comprise data extracted from the users past activities database 226. The extracted data may comprise the first browsing session "Session #1" and the second browsing session "Session #2" shown in FIG. 3. The extracted data may be selected on the basis that it relates to past activity indications associated with the first user "User #1". Once extracted, the past activity indications 602 may be processed by the vector generator 604 to generate past activity features which are then used to determine the past activity feature vector 606. In some embodiments, the past activity features may be generated by a hashing function. In some embodiments, the past activity feature vector 606 may be a multidimensional vector having n dimensions and being associated with a first value "Past Activity Feature 1", a second value "Past Activity Feature 2" and a third value "Past Activity Feature n". The past activity feature vector 606 may be associated with a greater or lesser number of values without departing from the scope of the present technology. In some embodiments, the vector generator 604 may be running on the server 222 and allows the generation of the past activity feature vector 606 from the past activity indications 602. The vector generator 604 may comprise a neural network such as one of the two neural networks depicted at FIG. 13. In some embodiments, the vector generator 604 may be similar to one of the vector mapping modules described in the '791 Application and the '907 Application.

Figure 7:
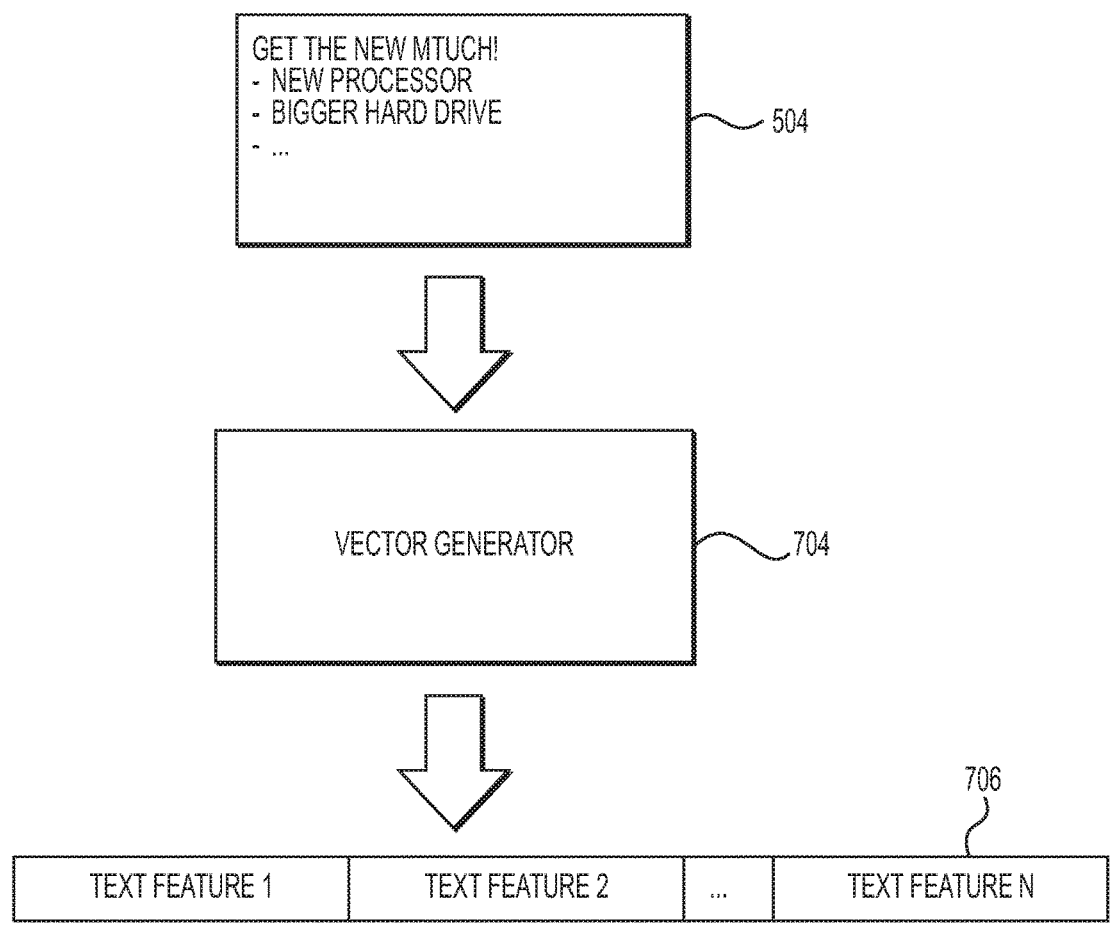
FIG. 7 is a diagram illustrating a text stream processed by a vector generator to generate a text feature vector in accordance with an embodiment of the present technology.

FIG. 7 depicts the text stream 504 of FIG. 4 being processed by a vector generator 704 to generate a text feature vector 706. In the example of FIG. 7, the text stream 504 corresponds to the text stream 504 associated with the banner 502. The text stream 504 may have been accessed from the items database 224. Once extracted, the text stream 504 may be processed by the vector generator 704 to generate text features which are then used to determine the text feature vector 706. In some embodiments, the text features may be generated by a hashing function. In some embodiments, the text feature vector 706 may be a multi-dimensional vector having n dimensions and being associated with a first value "Text Feature 1", a second value "Text Feature 2" and a third value "Text Feature n". The text feature vector 706 may be associated with a greater or lesser number of values without departing from the scope of the present technology. In some embodiments, the vector generator 704 may be running on the server 222 and allows the generation of the text feature vector 706 from the text stream 504. The vector generator 704 may comprise a neural network such as one of the two neural networks depicted at FIG. 13. In some embodiments, the vector generator 704 may be similar to one of the vector mapping modules described in the '791 Application and the '907 Application.

Figure 8:
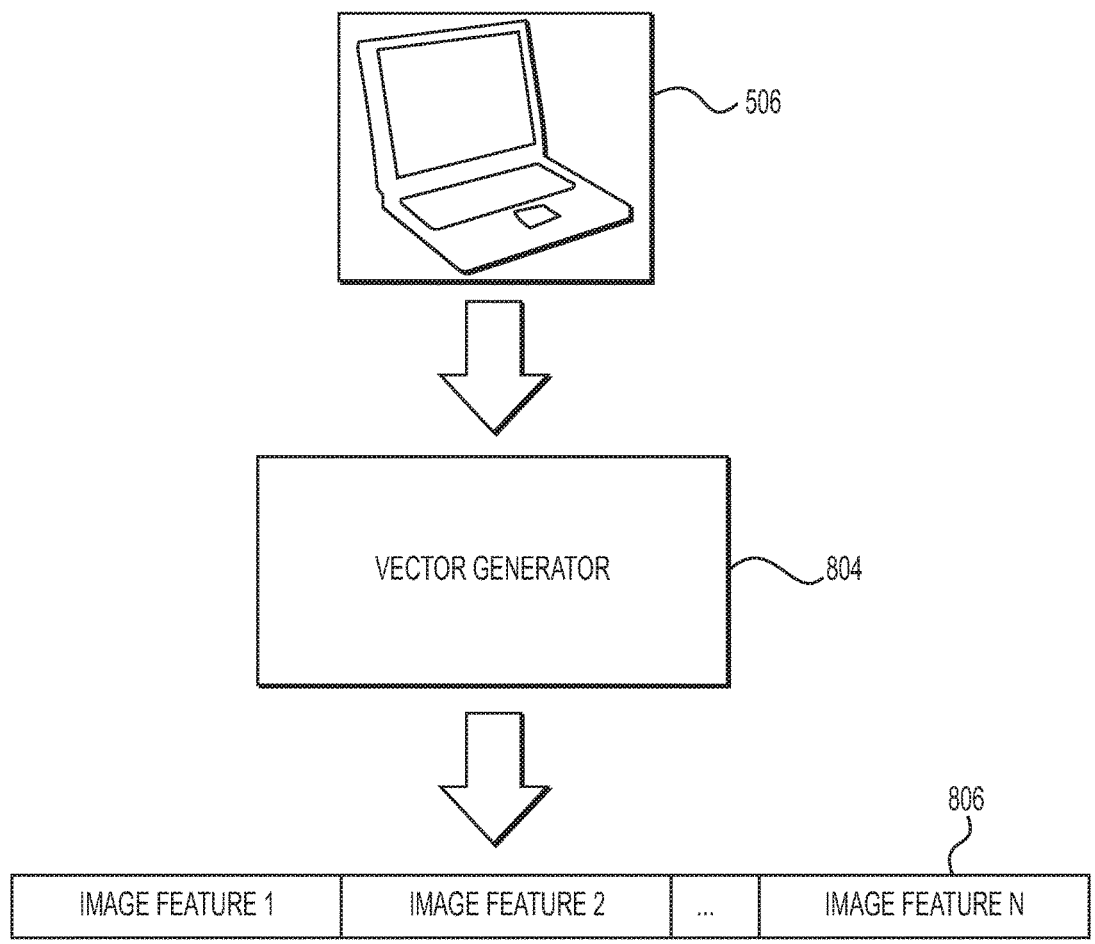
FIG. 8 is a diagram illustrating an image processed by a vector generator to generate an image feature vector in accordance with an embodiment of the present technology.

FIG. 8 depicts the image file 506 of FIG. 4 being processed by a vector generator 804 to generate an image feature vector 806. In the example of FIG. 8, the image file 506 corresponds to the image file 506 associated with the banner 502. The image file 506 may have been accessed from the items database 224. Once extracted, the image file 506 may be processed by the vector generator 804 to generate image features which are then used to determine the image feature vector 806. In some embodiments, the image features may be generated by a hashing function. In some embodiments, the image feature vector 806 may be a multidimensional vector having n dimensions and being associated with a first value "Image Feature 1", a second value "Image Feature 2" and a third value "Image Feature n". The image feature vector 806 may be associated with a greater or lesser number of values without departing from the scope of the present technology. In some embodiments, the vector generator 804 may be running on the server 222 and allows the generation of the image feature vector 806 from the image file 506. The vector generator 804 may comprise a neural network such as one of the two neural networks depicted at FIG. 13. In some embodiments, the vector generator 804 may be similar to one of the vector mapping modules described in the '791 Application and the '907 Application.

Figure 9:
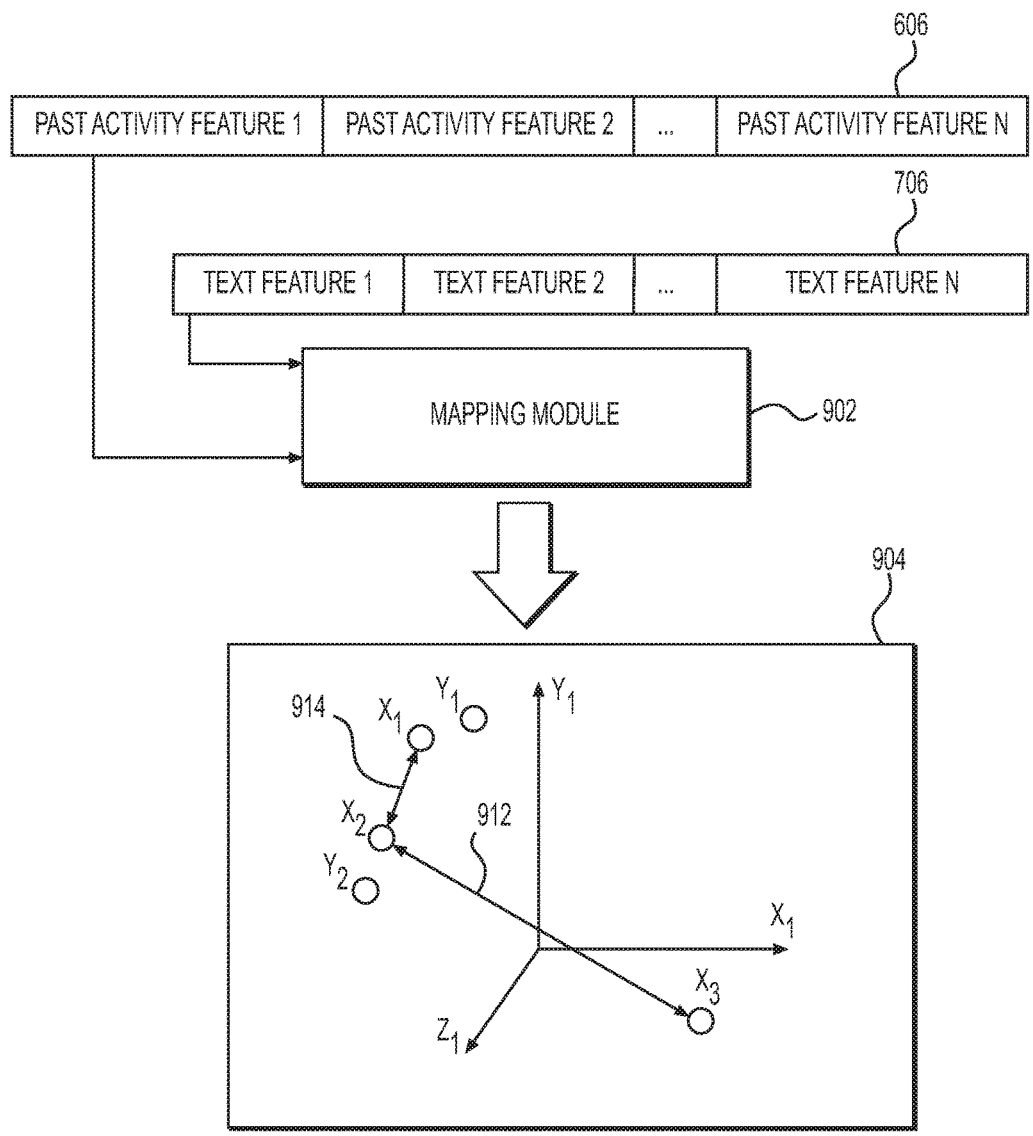
FIG. 9 is a diagram illustrating a past activity feature vector and a text feature vector processed by a mapping module to generate a text feature space in accordance with an embodiment of the present technology.

Turning now to FIG. 9, a text feature space 904 generated by a mapping module 902 on the basis of the past activity feature vector 606 and the text feature vector 706 is depicted. The mapping module 902 allows the mapping of the past activity feature vector 606 and the text feature vector 706 in a common space having n dimensions. In the example of FIG. 9, the text feature space 904 has three dimensions (i.e., $x_1$, $y_1$ and $z_1$). The text feature space 904 may be associated with a greater or lesser number of dimensions without departing from the scope of the present technology. A point $E_1$ may represent a projection of the text stream 504 in the text feature space 904. The points $E_2$ and $E_3$ may represent other text streams associated with items presented at a same e-commerce platform than the item associated with the text stream 504. The points $G_1$, and $G_2$ may represent other text streams associated with items presented at a second e-commerce platform, different from the first e-commerce platform. As the person skilled in the art of the present technology will appreciate, the present technology allows projection of items associated with different web platforms and/or e-commerce platforms in a same space thereby allowing to position representation of items independently of how indications associated with each one of the items are formed and/or structured. In the example of FIG. 9, a first distance 912 and a second distance 914 illustrates distances between the points $E_2$ and $E_3$ and $E_1$ and $E_2$ respectively. In an embodiment, the first distance 912 and the second distance 914 may reflect a number of navigation sessions separating the presentation of a first item represented by the point $E_1$ from the presentation of a second item represented by the point $E_2$ and the presentation of a third item represented by the point $E_3$. In some embodiments, the distance may reflect a number of navigation actions (e.g., a number of clicks) separating a first item from a second item. In yet some embodiments, the present technology may allow determining a distance between two items associated with different web platforms and/or e-commerce platforms such as the distance between point $E_1$ and the point $G_1$. As a person skilled in the art of the present technology will appreciate multiple variations may be envisioned without departing from the scope of the present technology (i.e., the distance may not be limited to a number of navigation sessions and/or a number of clicks separating two items).

In some embodiments, the mapping module 902 may be running on the server 222 and allows the generation of the text feature space 904 from the past activity feature vector 606 and the text feature vector 706. The mapping module 902 may comprise a neural network such as one of the two neural networks depicted at FIG. 13. In some embodiments, the neural network may comprise multiple neural networks. The neural networks may be trained while connected in a coupled Siamese neural network configuration, as described in "Multimodal similarity-preserving hashing" by Masci et al. ("Masci" hereinafter), published in Cornell University Library's "arXiv" archive for citation as "arXiv:1207.1522", the entirety of which is hereby incorporated by reference in jurisdictions so allowing. Each one of the neural networks may correspond to a respective user activity indication and may be trained so as to minimize cross-modal loss. In some embodiments, the mapping module 902 may be similar to one of the mapping modules described in the '791 Application and the '907 Application.

Figure 10:
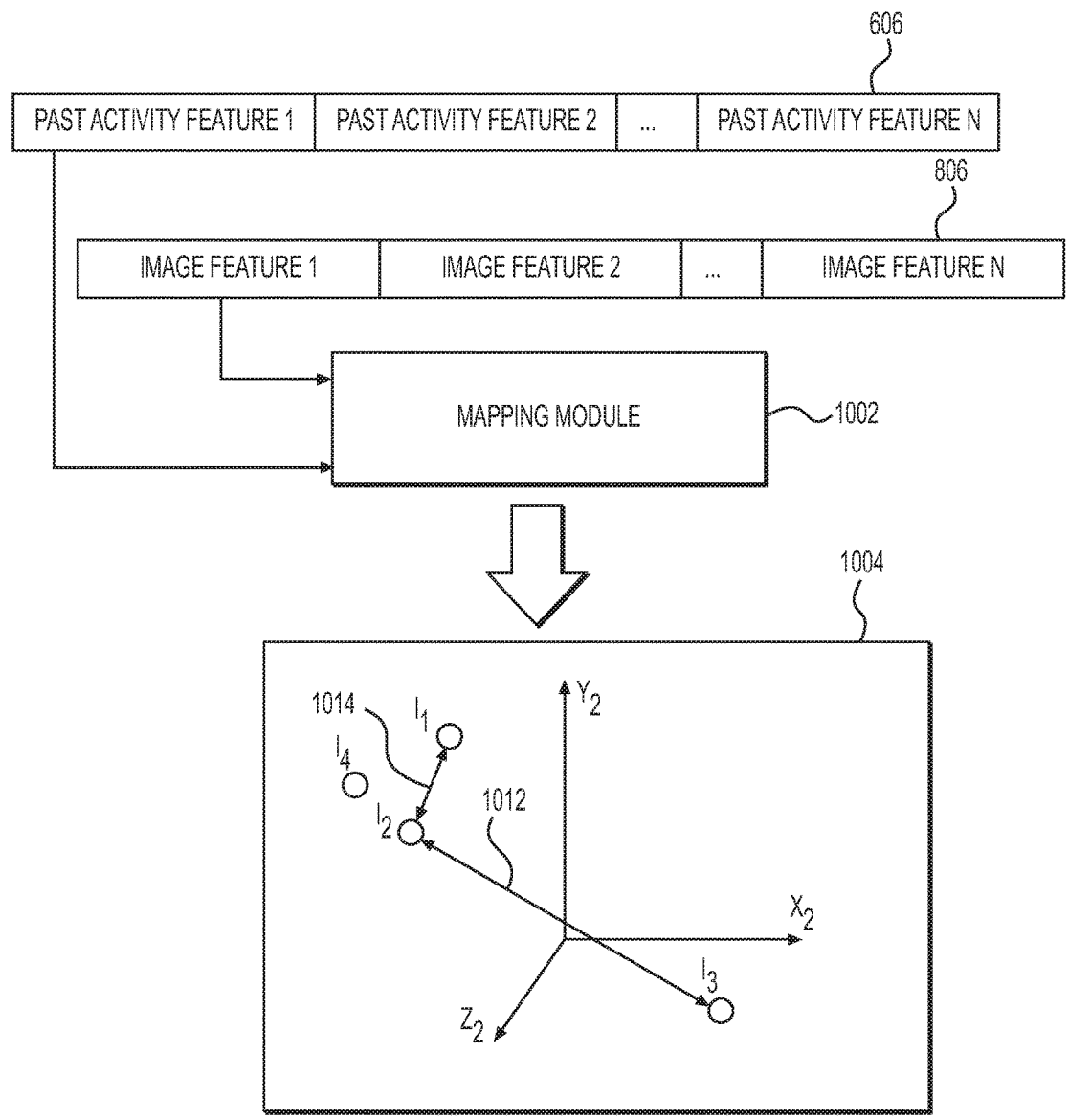
FIG. 10 is a diagram illustrating a past activity feature vector and an image feature vector processed by a mapping module to generate an image feature space in accordance with an embodiment of the present technology.

Turning now to FIG. 10, an image feature space 1004 generated by a mapping module 1002 on the basis of the past activity feature vector 606 and the image feature vector 806 is depicted. The mapping module 1002 allows the mapping of the past activity feature vector 606 and the image vector 806 in a common space having n dimensions. In the example of FIG. 10, the image feature space 1004 has three dimensions (i.e., $x_2$, $y_2$ and $z_2$). The image feature space 1004 may be associated with a greater or lesser number of dimensions without departing from the scope of the present technology. A point $I_1$ may represent a projection of the image file 506 in the image feature space 1004. The points $I_2$, $I_3$ and $I_4$ may represent other image files associated with items presented at common or distinct e-commerce platforms. As the person skilled in the art of the present technology will appreciate, the present technology allows projection of items associated with different web platforms and/or e-commerce platforms in a same space thereby allowing to position representation of items independently of how indications associated with each one of the items are formed and/or structured. In the example of FIG. 10, a first distance 1012 and a second distance 1014 illustrates distances between the points $I_2$ and $I_3$ and $I_1$ and $I_2$ respectively. In an embodiment, the first distance 1012 and the second distance 1014 may reflect a number of navigation sessions separating the presentation of a first item represented by the point $I_1$ from the presentation of a second item represented by the point $I_2$ and the presentation of a third item represented by the point $I_3$. In some embodiments, the distance may reflect a number of navigation actions (e.g., a number of clicks) separating a first item from a second item. In yet some embodiments, the present technology may allow determining a distance between two items associated with different web platforms and/or e-commerce platforms. As a person skilled in the art of the present technology will appreciate multiple variations may be envisioned without departing from the scope of the present technology (i.e., the distance may not be limited to a number of navigation sessions and/or a number of clicks separating two items).

In some embodiments, the mapping module 1002 may be running on the server 222 and allows the generation of the image feature space 1004 from the past activity feature vector 606 and the image vector 806. The mapping module 1002 may comprise a neural network such as one of the two neural networks depicted at FIG. 13. In some embodiments, the neural network may comprise multiple neural networks. The neural networks may be trained while connected in a coupled Siamese neural network configuration, as described Masci. Each one of the neural networks may correspond to a respective user activity indication and may be trained so as to minimize cross-modal loss. In some embodiments, the mapping module 1002 may be similar to one of the mapping modules described in the '791 Application and the '907 Application.

Figure 11:
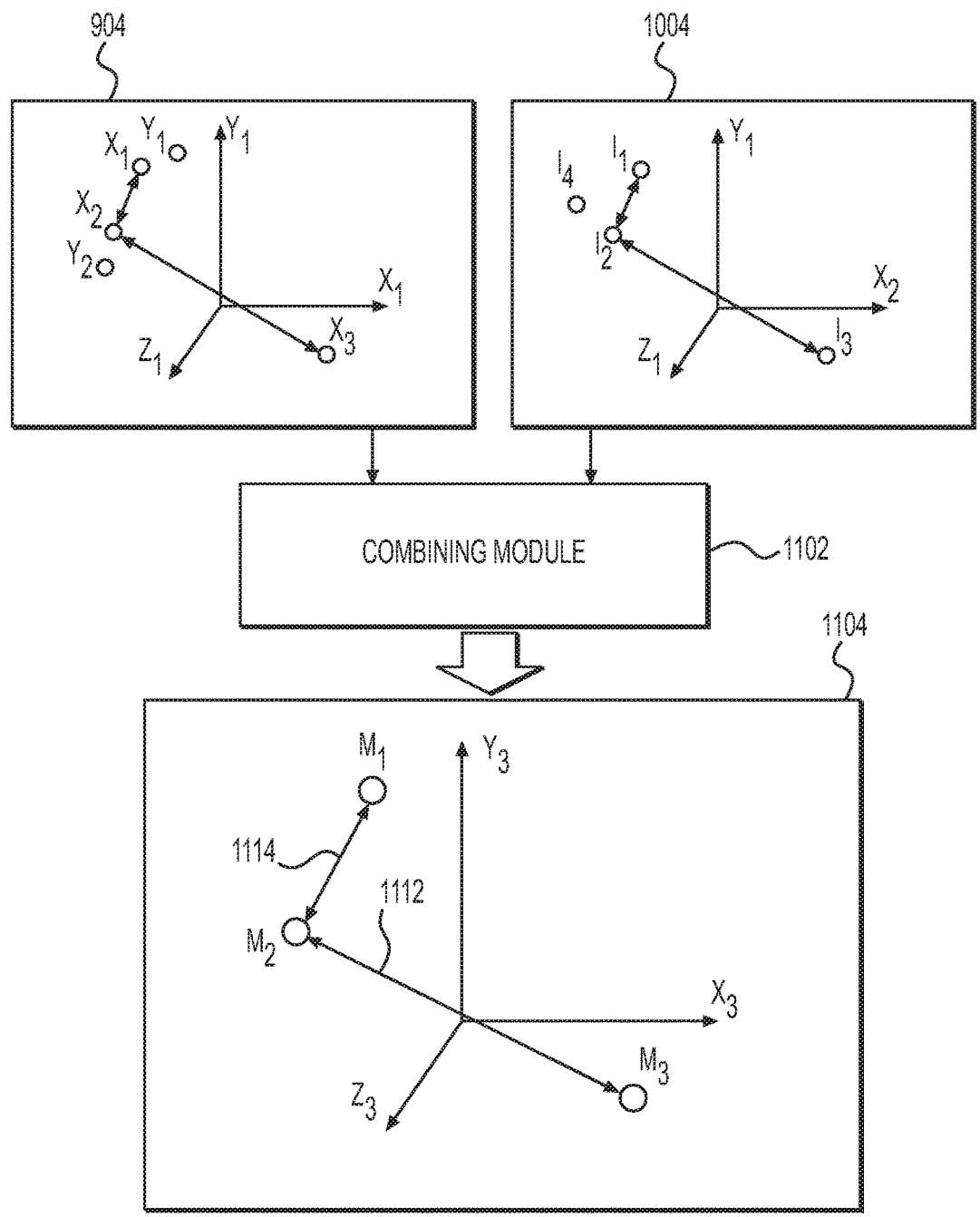
FIG. 11 is a diagram illustrating the text feature space and the image feature space processed by a combining module to generate a user item space in accordance with an embodiment of the present technology.

Turning now to FIG. 11, a user item space 1104 generated by a combining module 1102 on the basis of the text feature space 904 and the image feature space 1004. The combining module 1102 allows the combination of the text feature space 904 and the image feature space 1004 in a common space having n dimensions. In the example of FIG. 11, the user item space 1104 has three dimensions (i.e., $x_3$, $y_3$ and $z_3$). The user item space 1104 may be associated with a greater or lesser number of dimensions without departing from the scope of the present technology. A point $M_1$ may represent an item card formed by the merging of the points $E_1$, $G_1$ and $I_1$ thereby allowing to associate multiple indications associated with multiple items. In the example of the point $M_1$, the indication text stream 504 represented by the point $E_1$ and the indication image file 506 represented by the point $I_1$ are associated with the point $G_1$ which may represent an indication text stream associated with an item originating from a different web platforms and/or e-commerce. As the person skilled in the art of the present technology will appreciate, the present technology allows projection of items associated with different indications in a same space thereby allowing to position representation of items independently of the type of indications that are associated with each one of the items. In some embodiments, the present technology thereby allows to position an item in the user item space 1104 even though the item is associated with only one type of indication (for example, either an image file or a text stream). As an example, the present technology may represent an item associated with an image file in the user item space 1104 even though the item is not associated with a text stream. In some embodiments, the present technology thereby allows to position the item in the user item space 1104 solely based on an image file even though no keywords or written description have been associated with the image file. Conversely, in some embodiments, the present technology thereby allows to position the item in the user item space solely based on a text stream even though no image file has been associated with the text stream. In such embodiments, the present technology thereby allows to associate a text stream with an image file even though the item was not originally associated with an image file. As the person skilled in the art of the present technology will appreciate, multiple variations may be envisioned without departing from the scope of the present technology.

In the example of FIG. 11, a first distance 1112 and a second distance 1114 illustrates distances between the points $M_2$ and $M_3$ and $M_1$ and $M_2$ respectively. In an embodiment, the first distance 1112 and the second distance 1114 may reflect a number of navigation sessions separating the presentation of a first item represented by the point $M_1$ from the presentation of a second item represented by the point $M_2$ and the presentation of a third item represented by the point $M_3$. In some embodiments, the distance may reflect a number of navigation actions (e.g., a number of clicks) separating a first item from a second item. In yet some embodiments, the present technology may allow determining a distance between two items associated with different web platforms and/or e-commerce platforms. As a person skilled in the art of the present technology will appreciate multiple variations may be envisioned without departing from the scope of the present technology (i.e., the distance may not be limited to a number of navigation sessions and/or a number of clicks separating two items).

In some embodiments, the combining module 1102 may be running on the server 222 and allows the generation of the user item space 1104 from the text feature space 904 and the image feature space 1004. The combining module 1102 may comprise a neural network such as one of the two neural networks depicted at FIG. 13. In some embodiments, the neural network may comprise multiple neural networks. The neural networks may be trained while connected in a coupled Siamese neural network configuration, as described in Masci. In some embodiments, the combining module 1102 may be similar to one of the mapping modules described in the '791 Application and the '907 Application.

Figure 12:
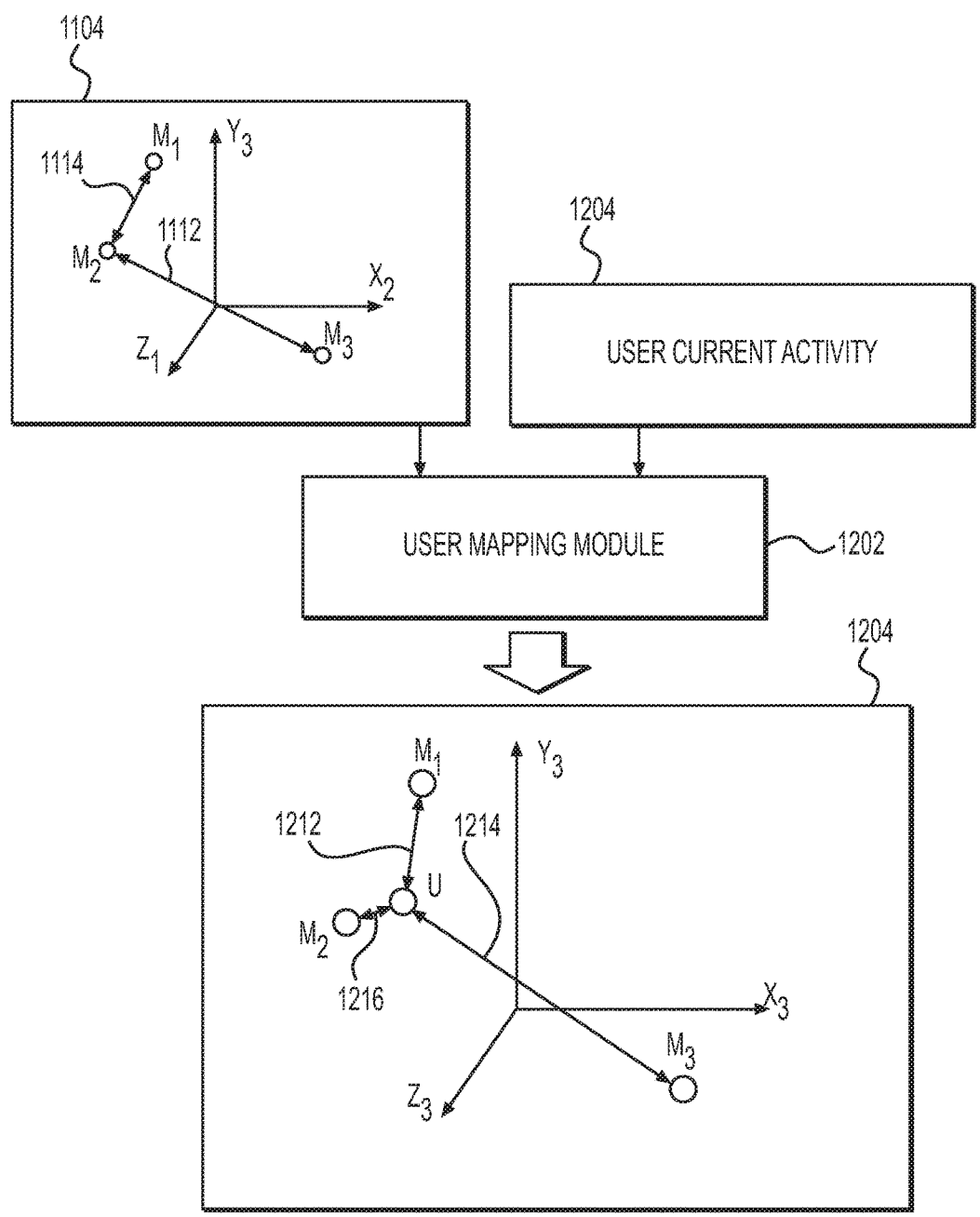
FIG. 12 is a diagram illustrating the user item space and user current activity processed by a user mapping module in accordance with an embodiment of the present technology.

Turning now to FIG. 12, a user item space 1206 generated by a user mapping module 1202 on the basis of the user item space 1104 and user current activity indications 1204. The user mapping module 1202 allows positioning a user associated with the user current activity indications 1204 in the user item space 1104. The user current activity indications 1204 may take various forms and may, in some embodiments, be similar or dissimilar to the indications of past user activities database 226. In some embodiment, the user current activity indications 1204 may be received from the electronic device 208. Once received by the server 222, the server 222 may cause the generation of the user item space 1104. In some embodiments, the user item space 1104 may have been previously generated and stored. Once the user item space 1104 is either generated or accessed by the server 222, the server 222 may process the user current activity indications 1204 so that a projection of the user associated with the user current activity indications 1204 may be created. In the example of FIG. 12, the projection of the user is represented by a point "U". In addition, a first distance 1212, a second distance 1214 and a third distance 1216 illustrate distances between the points $M_1$ and U, $M_3$ and U and $M_2$ and U respectively. What the distances represent has been previously detailed in connection with the description of FIGS. 9 to 11. In some embodiments, the server 222 may identify that the shorter distance is the distance 1216 representative of the distance between the points $M_2$ and U. On that basis, the server 222 may determine that, amongst the items represented by the points $M_1$, $M_2$ and $M_3$, the point $M_2$ is the most relevant to the user represented by the point U. As a result, the item represented by the point $M_2$ may be associated with the user and information relating to the item may be presented to the user, for example, by transmitting a banner comprising an image file and/or a text stream to the electronic device 208. This example is not limitative and other variations will become apparent to the person skilled in the art of the present technology.

In some embodiments, the user mapping module 1202 may be running on the server 222 and allows positioning a user associated with the user current activity indications 1204 in the user item space 1104. The user mapping module 1202 may comprise a neural network such as one of the two neural networks depicted at FIG. 13. In some embodiments, the neural network may comprise multiple neural networks. The neural networks may be trained while connected in a coupled Siamese neural network configuration, as described in Masci. In some embodiments, the user mapping module 1202 may be similar to one of the mapping modules described in the '791 Application and the '907 Application.

Figure 13:
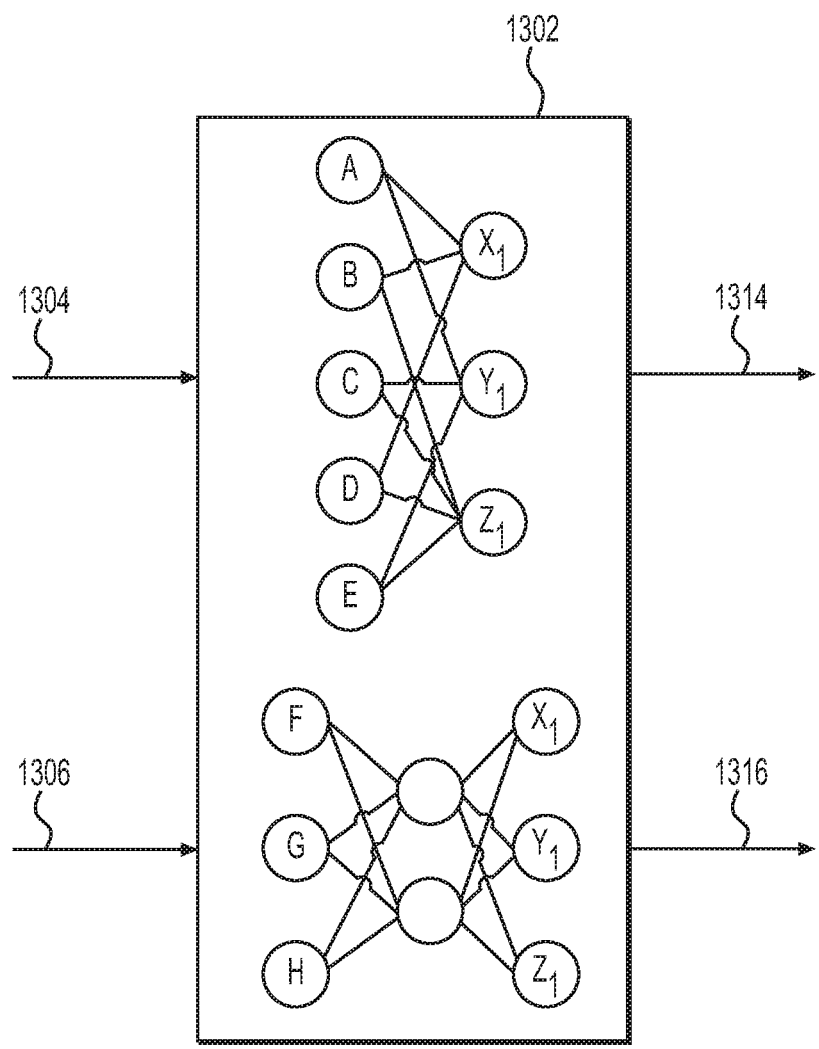
FIG. 13 is a diagram illustrating a first neural network and a second neural network in accordance with an embodiment of the present technology.

Turning now to FIG. 13, two neural networks which may be used in connection with the present technology are depicted. A first neural network allows mapping an input vector 1304 into an output vector or output space 1314. A second neural network allows mapping an input vector 1306 into an output vector or output space 1316. The first neural network and the second neural network may be used in connection with the generation of the past activity feature vector 606 by the vector generator 604, the generation of the text feature vector 706 by the vector generator 704, the generation of the image feature vector 806 by the vector generator 804, the generation of the text feature space 904 by the mapping module 902, the generation of the image feature space 1004 by the mapping module 1002, the generation of the user item space 1104 by the combining module 1102 and the generation of the mapping of the user current activity indications 1204 in the user item space 1104 by the user mapping module 1202.

The first neural network and the second neural network may each comprise an input layer with a number of input nodes equal to the dimensionability of the input vectors they are configured to map and an output layer with a number of output nodes equal to dimensionability of a multidimensional space. In the example of FIG. 13, the first neural network and the second neural network are configured so that a vector may be mapped in the text feature space 904 having three dimensions (i.e., $x_1$, $y_1$ and $z_1$). As previously mentioned, additional information regarding how the first neural network and the second neural network may be configured, trained and used may be found in the '791 Application and the '907 Application. As the person skilled in the art of the present technology will appreciate, the first neural network and the second neural network of FIG. 13 are depicted for illustrative purposes and are not limitative, many variations may be envisioned without departing from the scope of the present technology.

Figure 14:
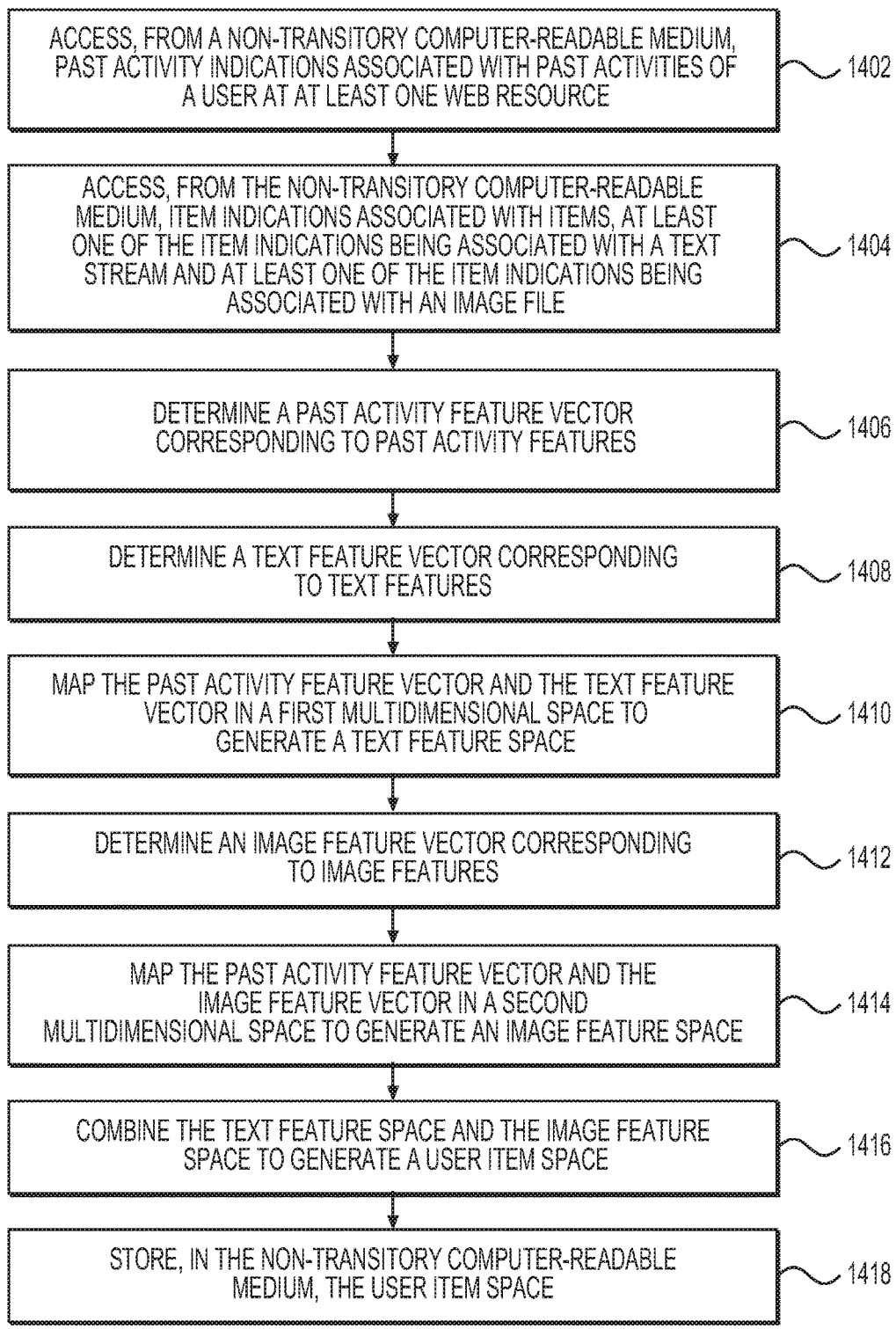
FIG. 14 is a flowchart illustrating a computer-implemented method implementing embodiments of the present technology.
Figure 15:
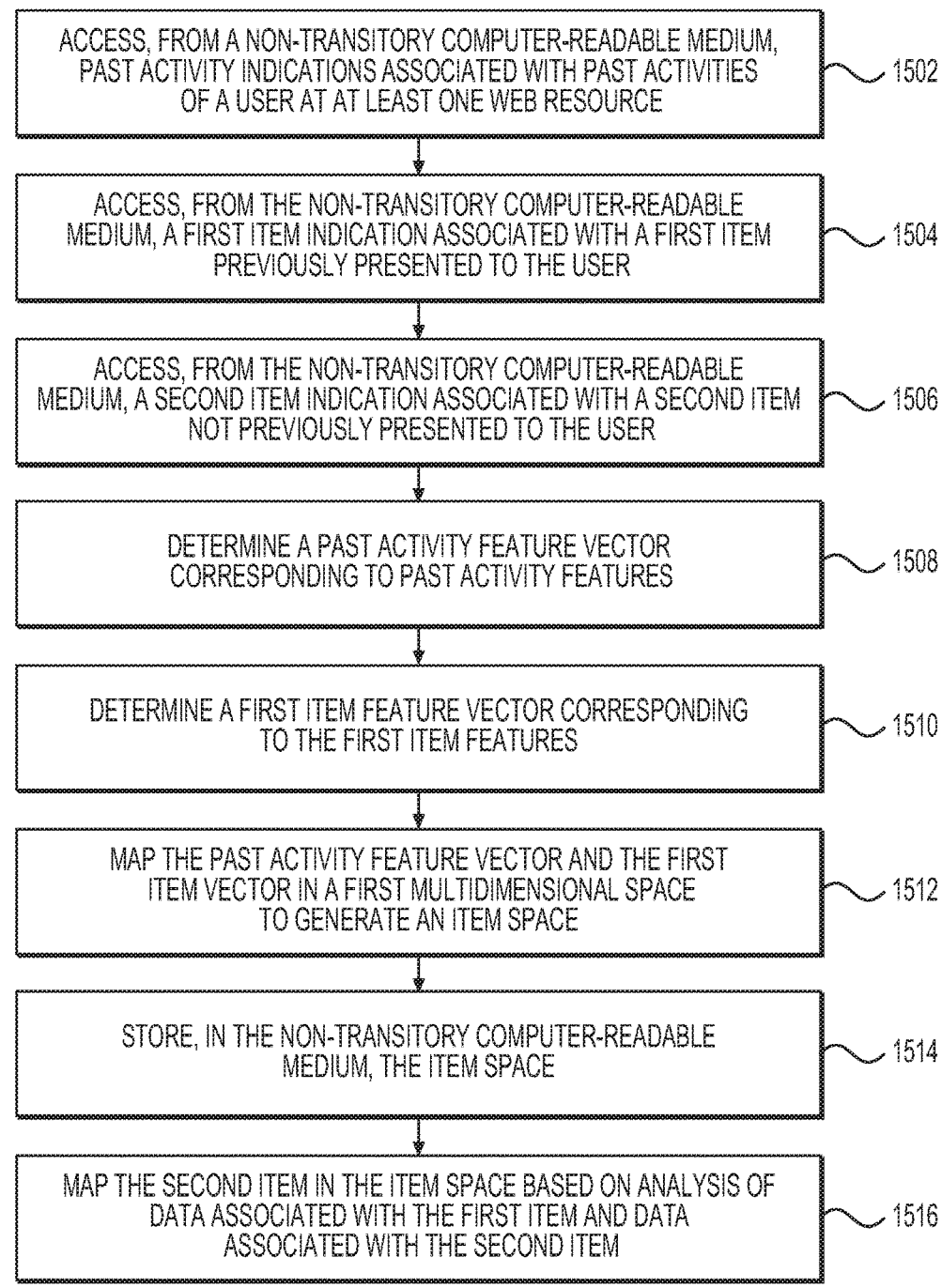
FIG. 15 is a flowchart illustrating a computer-implemented method implementing embodiments of the present technology.

Having described, with reference to FIG. 1 to FIG. 13, some non-limiting example instances of systems and computer-implemented methods used in connection with the problem of processing activity indications associated with a user, we shall now describe general solutions to the problem with reference to FIGS. 14 and 15.

More specifically, FIG. 14 shows a flowchart illustrating a computer-implemented method 1400 of associating past activity indications of a user with items. In some embodiments, the items are associated with a product and/or a service. In some embodiments, the items may comprise a first item previously presented to the user and a second item not previously presented to the user. In some embodiments, the past activity indications may comprise entries of a web browser log. The method 1400 starts with step 1402 wherein the past activity indications associated with the past activities of the user at at least one network resource are accessed from a non-transitory computer-readable medium. In some embodiments the at least one network resource may be a web resource such as an e-commerce platform. The method 1400 then proceeds to step 1404 wherein item indications associated with the items are accessed from the non-transitory computer-readable medium. At least one of the item indications may be associated with a text stream and/or an image file. In some embodiments, a first text stream may be associated with a first network resource and a second text stream may be associated with a second network resource, the first network resource being distinct from the second network resource.

At a step 1406, the method 1400 may determine a past activity feature vector corresponding to past activity features. In some embodiments, the past activity features may be generated based on the past activity indications. Then, at a step 1408, the method 1400 may determine a text feature vector corresponding to text features. In some embodiments, the text features may be generated based on the text stream. At a step 1410, the method 1400 may map the past activity feature vector and the text feature vector in a first multidimensional space to generate a text feature space, the text feature space reflecting associations between the past activity indications and the text stream. In some embodiments, the method 1400 may map the past activity feature vector and a first text feature vector associated with the first item in the first multidimensional space; and may map the first text feature vector and a second text feature vector associated with the second item in the first multidimensional space.

At a step 1412, the method 1400 may determine an image feature vector corresponding to image features. In some embodiments, the image features may be generated based on the image file. Then, at a step 1414, the method 1400 may map the past activity feature vector and the image feature vector in a second multidimensional space to generate an image feature space, the image feature space reflecting associations between the past activity indications and the image file.

Then, at a step 1416, the method 1400 may combine the text feature space and the image feature space to generate a user item space, the user item space reflecting associations between the past activity indications and the items. Then, at a step 1418, the method 1400 may store, in the non-transitory computer-readable medium, the user item space. In some embodiments, the method 1400 may further comprise receiving current activity indications associated with current activities of the user at a network resource; and identifying one of the items to be associated with the user based on an analysis of the user item space and the current activity indications. In some embodiments, the analysis of the user item space and the current activity indications comprises an analysis of a distance between the one of the items and a representation of the current activity indications in the user item space. In some embodiments, the method 1400 further comprises receiving current activity indications associated with current activities of the user at a network resource; generating current activity features associated with the current activity indications; determining a current activity feature vector corresponding to the current activity features; and mapping the user item space and the current activity feature vector in a third multidimensional space to identify one of the items to be associated with the user. In some embodiments, identifying the one of the items to be associated with the user is based on a distance between the one of the items and a location of the current activity feature vector in the user item space.

In yet some other embodiments, the method 1400 further comprises causing an electronic device associated with the user to display at least one of the text stream and the image file associated with the identified one of the items. In some embodiments, the first multidimensional space and the second multidimensional space define a same multidimensional space. In yet some other embodiments, the first multidimensional space, the second multidimensional space and the third multidimensional space define a same multidimensional space. In some embodiments, at least one of determining the text feature vector, determining the image feature vector and determining the past activity vector comprise conducting a neural network analysis. In yet some embodiments, determining the current activity vector comprises conducting a neural network analysis.

In some embodiments, a distance between a first one of the items and a second one of the items represented in at least one of the text feature space, the image feature space and the user item space reflects whether the first one of the items and the second one of the items were previously presented to the user during a same navigation session of the network resource. In yet some other embodiments, a distance between a first one of the items and a second one of the items represented in at least one of the text feature space, the image feature space and the user item space reflects a number of navigation sessions separating the presentation of the first one of the items to the user from the presentation of the second one of the items to the user.

Turning now to FIG. 15, a flowchart illustrating a computer-implemented method 1500 of associating a first item and a second item. The method 1500 may start at a step 1502 wherein past activity indications associated with past activities of the user at at least one network resource are accessed from a non-transitory computer-readable medium. The method 1500 may then proceeds to a step 1504 wherein the first item indication associated with a first item previously presented to the user is accessed from the non-transitory computer-readable medium. Then, at a step 1506, the second item indication associated with a second item not previously presented to the user is accessed from the non-transitory computer-readable medium.

At a step 1508, the method 1500 may determine a past activity feature vector corresponding to past activity features. In some embodiments, the past activity features may be generated based on the past activity indications. At a step 1510, the method 1500 may determine a first item feature vector corresponding to first item features. In some embodiments, the first item features may be generated based on the first item. Then, at a step 1512, the method 1500 maps the past activity feature vector and the first item vector in a first multidimensional space to generate an item space, the item space reflecting associations between past activity indications and the first item. At a step 1514, the method 1500 may store, in the non-transitory computer-readable medium, the item space. At a step 1516, the method 1500 may then map the second item in the item space based on analysis of data associated with the first item and data associated with the second item.

In some embodiments, the method 1500 may further comprise, accessing, from the non-transitory computer-readable medium, an image file associated with one of the first item and the second item; generating image features associated with the image file; determining an image feature vector corresponding to the image features; mapping the past activity feature vector and the image feature vector in the first multidimensional space to generate an image feature space, the image feature space reflecting associations between past activity indications and the image file; and combining the item space and the image feature space to generate an item image space. In some embodiments, the method 1500 further comprises receiving current activity indications associated with current activities of the user at a network resource; and determining that the second item is to be associated with the user based on an analysis of a location of the second item in the item space and the current activity indications.

In yet some other embodiments, the method 1500 may comprise receiving current activity indications associated with current activities of the user at a network resource; generating current activity features associated with the current activity indications; determining a current activity feature vector corresponding to the current activity features; and mapping the item space and the current activity feature vector in the first multidimensional space to determine whether the second item is to be associated with the user.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

One skilled in the art will appreciate when the instant description refers to "receiving data" from a user that the electronic device 208 or another electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method of associating activity indications associated with activities of a user with items, the method executable by a server, the method comprising:
   accessing, from a non-transitory computer-readable medium, past activity indications associated with past activities of the user at at least one network resource;
   accessing, from the non-transitory computer-readable medium, item indications associated with the items, at least one of the item indications being associated with a text stream and at least one of the item indications being associated with an image file;
   generating past activity features associated with the past activity indications;
   determining a past activity feature vector corresponding to the past activity features;
   generating text features associated with the text stream;
   determining a text feature vector corresponding to the text features;
   mapping the past activity feature vector and the text feature vector in a first multidimensional space to generate a text feature space, the text feature space reflecting associations between the past activity indications and the text stream;
   generating image features associated with the image file;
   determining an image feature vector corresponding to the image features;
   mapping the past activity feature vector and the image feature vector in a second multidimensional space to generate an image feature space, the image feature space reflecting associations between the past activity indications and the image file;
   combining the text feature space and the image feature space to generate a user item space, the user item space reflecting associations between the past activity indications and the items, thereby allowing associations between the past activity indications and the items even though at least one of the items is only associated with a single one of a text feature and an image file;
   storing, in the non-transitory computer-readable medium, the user item space;
   receiving current activity indications associated with current activities of the user at a network resource;
   generating current activity features associated with the current activity indications;
   determining a current activity feature vector corresponding to the current activity features; and
   mapping the user item space and the current activity feature vector in a third multidimensional space to identify one of the items to be associated with the user, identifying the one of the items to be associated with the user being based on a distance between the one of the items and a location of the current activity feature vector in the user item space,
   the first multidimensional space, the second multidimensional space and the third multidimensional space defining a same multidimensional space.

2. The method of claim 1, further comprising causing an electronic device associated with the user to display at least one of the text stream and the image file associated with the identified one of the items.

3. The method of claim 1, wherein the items comprise a first item previously presented to the user and a second item not previously presented to the user.

4. The method of claim 3, wherein mapping the past activity feature vector and the text feature vector comprises:
   mapping the past activity feature vector and a first text feature vector associated with the first item in the first multidimensional space; and
   mapping the first text feature vector and a second text feature vector associated with the second item in the first multidimensional space.

5. The method of claim 1, wherein the distance between a first one of the items and a second one of the items represented in at least one of the text feature space, the image feature space and the user item space reflects whether the first one of the items and the second one of the items were previously presented to the user during a same navigation session of the network resource.

6. The method of claim 1, wherein the distance between a first one of the items and a second one of the items represented in at least one of the text feature space, the image feature space and the user item space reflects a number of navigation sessions separating the presentation of the first one of the items to the user from the presentation of the second one of the items to the user.

7. A computer-implemented system for associating activity indications associated with activities of a user with items, the system comprising:
   a non-transitory computer-readable medium;
   a processor configured to perform:
      accessing, from the non-transitory computer-readable medium, past activity indications associated with past activities of the user at at least one network resource;
      accessing, from the non-transitory computer-readable medium, item indications associated with the items, at least one of the item indications being associated with a text stream and at least one of the item indications being associated with an image file;
      generating past activity features associated with the past activity indications;
      determining a past activity feature vector corresponding to the past activity features;
      generating text features associated with the text stream;
      determining a text feature vector corresponding to the text features;
      mapping the past activity feature vector and the text feature vector in a first multidimensional space to generate a text feature space, the text feature space reflecting associations between the past activity indications and the text stream;

generating image features associated with the image file;

determining an image feature vector corresponding to the image features;

mapping the past activity feature vector and the image feature vector in a second multidimensional space to generate an image feature space, the image feature space reflecting associations between the past activity indications and the image file;

combining the text feature space and the image feature space to generate a user item space, the user item space reflecting associations between the past activity indications and the items, thereby allowing associations between the past activity indications and the items even though at least one of the items is only associated with a single one of a text feature and an image file;

storing, in the non-transitory computer-readable medium, the user item space;

receiving current activity indications associated with current activities of the user at a network resource;

generating current activity features associated with the current activity indications;

determining a current activity feature vector corresponding to the current activity features; and mapping the user item space and the current activity feature vector in a third multidimensional space to identify one of the items to be associated with the user, identifying the one of the items to be associated with the user being based on a distance between the one of the items and a location of the current activity feature vector in the user item space, the first multidimensional space, the second multidimensional space and the third multidimensional space defining a same multidimensional space.

8. The system of claim 7, further comprising causing an electronic device associated with the user to display at least one of the text stream and the image file associated with the identified one of the items.

9. The system of claim 7, wherein the items comprise a first item previously presented to the user and a second item not previously presented to the user.

10. The system of claim 9, wherein mapping the past activity feature vector and the text feature vector comprises:
mapping the past activity feature vector and a first text feature vector associated with the first item in the first multidimensional space; and
mapping the first text feature vector and a second text feature vector associated with the second item in the first multidimensional space.

11. The system of claim 7, wherein the distance between a first one of the items and a second one of the items represented in at least one of the text feature space, the image feature space and the user item space reflects whether the first one of the items and the second one of the items were previously presented to the user during a same navigation session of the network resource.

12. The system of claim 7, wherein a distance between the first one of the items and a second one of the items represented in at least one of the text feature space, the image feature space and the user item space reflects a number of navigation sessions separating the presentation of the first one of the items to the user from the presentation of the second one of the items to the user.

* * * * *